United States Patent
Hamers et al.

(10) Patent No.: US 9,991,562 B2
(45) Date of Patent: Jun. 5, 2018

(54) SYMMETRICAL AND UNSYMMETRICAL ORGANOSILICON MOLECULES AND ELECTROLYTE COMPOSITIONS AND ELECTROCHEMICAL DEVICES CONTAINING THEM

(71) Applicant: Silatronix, Inc., Madison, WI (US)

(72) Inventors: Robert J Hamers, Madison, WI (US); Robert C West, Madison, WI (US); José A Peña Hueso, Madison, WI (US); Monica L Usrey, Madison, WI (US); Jian Dong, Fort Collins, CO (US)

(73) Assignee: Silatronix, Inc., Madison, WI (US)

(*) Notice: Subject to any disclaimer, the term of this patent is extended or adjusted under 35 U.S.C. 154(b) by 0 days. days.

(21) Appl. No.: 14/426,531

(22) PCT Filed: Sep. 6, 2013

(86) PCT No.: PCT/US2013/058601
§ 371 (c)(1),
(2) Date: Mar. 6, 2015

(87) PCT Pub. No.: WO2014/039886
PCT Pub. Date: Mar. 13, 2014

(65) Prior Publication Data
US 2015/0221986 A1 Aug. 6, 2015

Related U.S. Application Data

(60) Provisional application No. 61/698,010, filed on Sep. 7, 2012.

(51) Int. Cl.
| | |
|---|---|
| *H01M 10/056* | (2010.01) |
| *H01M 10/0569* | (2010.01) |
| *H01M 10/052* | (2010.01) |
| *H01M 10/0568* | (2010.01) |

(52) U.S. Cl.
CPC ..... *H01M 10/0569* (2013.01); *H01M 10/052* (2013.01); *H01M 10/0568* (2013.01); *H01M 2300/0037* (2013.01)

(58) Field of Classification Search
USPC .............. 429/188, 189, 300–347, 199–207
See application file for complete search history.

(56) References Cited

U.S. PATENT DOCUMENTS

| | | | |
|---|---|---|---|
| 6,124,062 A | 9/2000 | Horie et al. | |
| 7,498,102 B2 | 3/2009 | Oh et al. | |
| 2007/0092776 A1 | 4/2007 | Akiyama et al. | |
| 2010/0028785 A1 | 2/2010 | Choi et al. | |
| 2011/0076572 A1 | 3/2011 | Amine et al. | |
| 2011/0274985 A1 | 11/2011 | Usrey et al. | |
| 2012/0082890 A1* | 4/2012 | Dong | H01M 6/164 429/188 |
| 2012/0135313 A1 | 5/2012 | West et al. | |
| 2014/0023932 A1* | 1/2014 | Zhang | H01M 10/0564 429/306 |
| 2014/0093754 A1* | 4/2014 | Hamers | H01M 4/5835 429/50 |

* cited by examiner

*Primary Examiner* — Jonathan Crepeau
(74) *Attorney, Agent, or Firm* — Joseph T. Leone, Esq.; DeWitt Ross & Stevens S.C.

(57) ABSTRACT

Described are organosilicon electrolyte compositions having improved thermostability and electrochemical properties and electrochemical devices that contain the organosilicon electrolyte compositions.

12 Claims, 21 Drawing Sheets

SYMMETRICAL AND UNSYMMETRICAL ORGANOSILICON MOLECULES AND ELECTROLYTE COMPOSITIONS AND ELECTROCHEMICAL DEVICES CONTAINING THEM

CROSS-REFERENCE TO RELATED APPLICATIONS

Priority is hereby claimed to provisional application Ser. No. 61/698,010, filed Sep. 7, 2012, which is incorporated herein by reference.

FEDERAL FUNDING STATEMENT

This invention was made with government support under contract number N68335-11-C-0401 awarded by the Naval Air Warfare Center. The government has certain rights in the invention.

BACKGROUND

There has been quite a bit of commercial interest in batteries and other charge-storage devices that utilize organosilicon (OS) compounds as part of the electrolyte composition. While organosilicon compounds have great theoretical promise for use in electrolytes for lithium ion batteries, finding a combination of OS, salts, and other additives that yields a commercially acceptable electrolyte has remained elusive. This is due, in large part, to the many physical characteristics that must be appropriately balanced in the final product. Such physical characteristics include those directly related to electrical performance, such as conductivity and cell-cycle performance. Other important physical characteristics relate to safety and performance concerns, such as viscosity, flashpoint, thermal stability, electrochemical stability, and cell performance at elevated and/or reduced temperatures. An ideal electrolyte must balance these physical characteristics judiciously to yield a battery or charge-storage device that simultaneously performs well at its intended purpose, has a long duty life, has a long storage life, and is not unacceptably hazardous should the electrolyte be released into the atmosphere.

SUMMARY

Disclosed herein are organosilicon electrolyte compositions and electrical devices that use them. The devices are generally charge-storage devices (batteries, cells, capacitors, and the like) comprising a first electrode (typically the anode), a second, counter-electrode (the cathode), and an electrolyte comprising an organosilicon molecule and at least one lithium salt. The device is preferably dimensioned and configured to store and controllably release electrical energy.

In different versions of the device, the first electrode may comprise, for example, an amorphous silicon film, a silicon nanowire, elemental silicon or alloys containing silicon, or a composite anode comprising silicon, graphite, and a binder. The first electrode may also be fabricated from or otherwise comprise silicon particles having an average particle size of from about 10 nanometers to about 10 microns, a carbon-containing conductivity additive, and a polymeric binder. The first electrode may optionally be carbonized, such as by heating in a furnace. Alternatively, the first electrode may comprise commercial graphite materials that are typically used in current Li Ion commercial cells.

The second, counter-electrode can be fabricated from any suitable material, without limitation. However, it is preferred that the second electrode comprises one or more materials selected from metallic lithium, a manganese-cobalt-nickel layered material, $LiCoO_2$, $LiMn_2O_4$, $LiNiO_2$, $LiFePO_4$, $Li_2FePO_4F$, $LiCo_{1/3}Ni_{1/3}Mn_{1/3}O_2$, and $Li(Li_aNi_xMn_yCo_z)O_2$. The cathode may also be oxygen from air. In any version of the composition described herein, at least one salt may be a lithium-containing salt. At least one lithium-containing salt may be present in a concentration of from about 0.1 M to about 3.5 M. Concentrations above and below 0.1 M to 3.5 M are explicitly within the scope of the composition described and claimed herein.

The electrolyte used in the device preferably comprises one or more organosilicon molecules. The electrolyte composition may further comprise a co-solvent, preferably a carbonate moiety (—O—C(=O)—O—). The lithium salt in all versions of the electrolyte composition described herein is preferably selected from the group consisting of LiTFSI, $LiPF_6$, LiBOB, $LiClO_4$, $LiBF_4$, $LiAsF_6$, $LiSbF_6$, $LiTaF_6$, $LiNbF_6$, $LiCF_3SO_3$, $LiC_4F_9SO_3$, $Li(FSO_2)_2N$, $Li(CF_3SO_2)_2N$, $Li(C_2F_5SO_2)_2N$, $Li(CF_3SO_2)_3C$, $LiBF_3(C_2F_5)$, $LiB(C_2O_4)_2$, $LiB(C_6F_5)_4$, $LiPF_3(C_2F_5)_3$, $½Li_2B_{12}F_{12}$, and combinations thereof. Other organosilicon molecules and other lithium salts are exclusively within the scope of the invention. This foregoing list is by way of example only and not limitation.

The electrolyte composition may be a liquid, a gel, or a solid.

Also described herein is an electrochemical device characterized in that it includes an electrolyte composition as recited as described and claimed herein. The electrochemical device may include an anode and the electrolyte composition may further be characterized in that it forms a passivation layer on the anode. In one version, the device is a lithium secondary battery comprising at least one lithium metal oxide cathode and at least one anode.

In one version of the device, the electrolyte comprises an organosilicon molecule selected from the group consisting of:

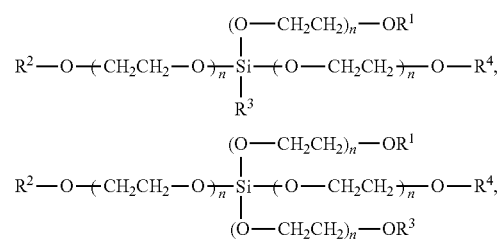

-continued

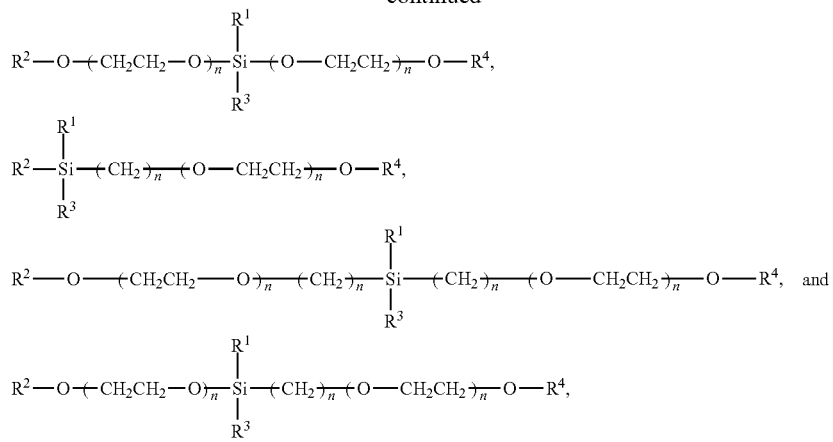

and combinations thereof, wherein $R^1$, $R^2$, $R^3$, and $R^4$ are the same or different and are independently selected from the group consisting of $C_1$-$C_6$-linear, branched, or cyclic alkyl, and each "n" is independently an integer of from 1 to 15. In molecules that are capable of being symmetrical, it is preferred, but not required, that where more than one "n" appears in the molecule, the two "n" substituents are the same value.

Optionally, the electrolyte may further comprise a carbonate additive, such as vinylene carbonate (VC), $C_2$-$C_6$-alkylene carbonate, $C_1$-$C_6$-dialkylcarbonate, etc.

Preferred compounds are those in which $R^1$-$R^4$ are independently selected from methyl, ethyl, or propyl (i.e., $C_1$-$C_3$-alkyl). The compounds wherein $R^1$-$R^4$ are methyl are generally preferred, for example:

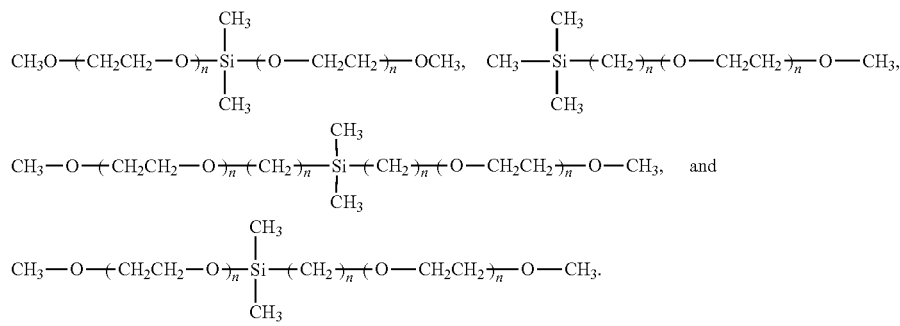

(Again, the subscripts "n" are independently selected from 1 to 15.)

In all versions of the electrolyte composition disclosed herein, it is preferred, although not required that the electrolyte composition undergoes no more than about 10% thermal decomposition at a temperature of about 100° C. or less. In all versions of the electrolyte composition disclosed herein, it is preferred, although not required that the electrolyte composition undergoes no more than about 20% thermal decomposition at a temperature of about 150° C. or less.

In one version of the electrolyte composition, the organosilicon is selected from the group consisting of:

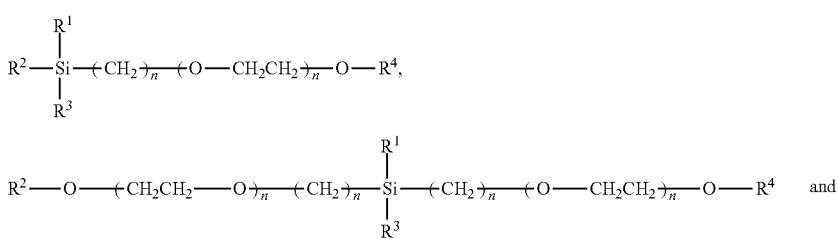

-continued

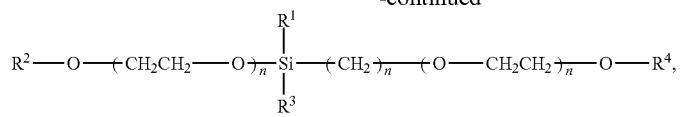

and combinations thereof, wherein $R^1$, $R^2$, $R^3$, and $R^4$ are the same or different and are independently selected from the group consisting of $C_1$-$C_6$-linear, branched, or cyclic alkyl, and each "n" is independently an integer of from 1 to 15; wherein the lithium-containing salt is selected from the group consisting of LiTFSI, LiPF$_6$, LiBOB, LiClO$_4$, LiBF$_4$, LiAsF$_6$, LiSbF$_6$, LiTaF$_6$, LiNbF$_6$, LiCF$_3$SO$_3$, LiC$_4$F$_9$SO$_3$, Li(FSO$_2$)$_2$N, Li(CF$_3$SO$_2$)$_2$N, Li(C$_2$F$_5$SO$_2$)$_2$N, Li(CF$_3$SO$_2$)$_3$C, LiBF$_3$(C$_2$F$_5$), LiB(C$_2$O$_4$)$_2$, LiB(C$_6$F$_5$)$_4$, LiPF$_3$(C$_2$F$_5$)$_3$, ½Li$_2$B$_{12}$F$_{12}$, and combinations thereof; and wherein the lithium-containing salt is present in a concentration of from about 0.1 M to about 3.5 M. Here, the silicon-containing electrolyte includes at least one ethylene oxide chain attached to the silicon atom via an alkylenyl spacer group.

More specifically, disclosed herein are the following compositions of matter:

1. An electrolyte composition comprising at least one organosilicon and a lithium-containing salt, wherein the organosilicon is selected from the group consisting of:

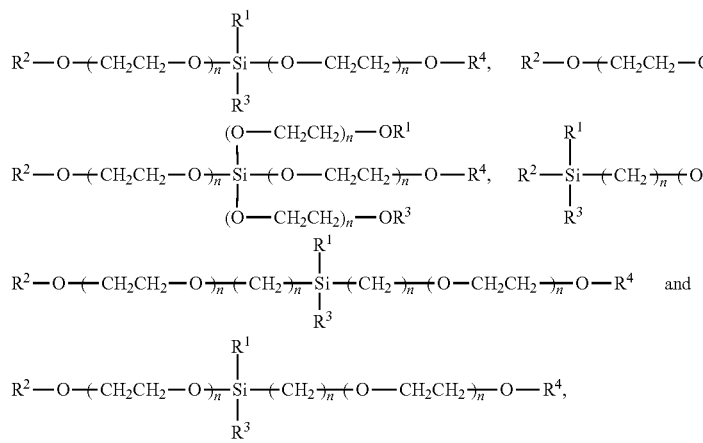

and combinations thereof,
wherein $R^1$, $R^2$, $R^3$, and $R^4$ are the same or different and are independently selected from the group consisting of $C_1$-$C_6$-linear, branched, or cyclic alkyl, and each "n" is independently an integer of from 1 to 15.

2. The electrolyte composition of preceding paragraph 1, wherein the composition undergoes no more than about 10% thermal decomposition at a temperature of about 100° C. or less.

3. The electrolyte composition of any of preceding paragraphs 1 and 2, wherein the composition undergoes no more than about 20% thermal decomposition at a temperature of about 150° C. or less.

4. The electrolyte composition of any of preceding paragraphs 1-3, wherein the lithium-containing salt is selected from the group consisting of LiTFSI, LiPF$_6$, LiBOB, LiClO$_4$, LiBF$_4$, LiAsF$_6$, LiSbF$_6$, LiTaF$_6$, LiNbF$_6$, LiCF$_3$SO$_3$, LiC$_4$F$_9$SO$_3$, Li(FSO$_2$)$_2$N, Li(CF$_3$SO$_2$)$_2$N, Li(C$_2$F$_5$SO$_2$)$_2$N, Li(CF$_3$SO$_2$)$_3$C, LiBF$_3$(C$_2$F$_5$), LiB(C$_2$O$_4$)$_2$, LiB(C$_6$F$_5$)$_4$, LiPF$_3$(C$_2$F$_5$)$_3$, ½Li$_2$B$_{12}$F$_{12}$, and combinations thereof.

5. The electrolyte composition of any of preceding paragraphs 1-4, wherein the lithium-containing salt is present in a concentration of from about 0.1 M to about 3.5 M.

6. The electrolyte composition of preceding paragraphs 1-5, wherein the composition undergoes no more than about 10% thermal decomposition at a temperature of about 100° C. or less.

7. The electrolyte composition of any of preceding paragraphs 1-6, wherein the composition undergoes no more than about 20% thermal decomposition at a temperature of about 150° C. or less.

8. The electrolyte composition of any of preceding paragraphs 1-7, wherein the lithium-containing salt is selected from the group consisting of LiPF$_6$, LiBF$_4$, LiAsF$_6$, LiSbF$_6$, LiTaF$_6$, and LiNbF$_6$.

9. The electrolyte composition of any of preceding paragraphs 1-8, wherein the lithium-containing salt is present in a concentration of from about 0.1 M to about 3.5 M.

10. The electrolyte composition of any of preceding paragraphs 1-9, wherein the composition undergoes no more than about 10% thermal decomposition at a temperature of about 100° C. or less.

11. The electrolyte composition of any of preceding paragraphs 1-10, wherein the composition undergoes no more than about 20% thermal decomposition at a temperature of about 150° C. or less.

12. The electrolyte composition of any of preceding paragraphs 1-11, further comprising a co-solvent.

13. The electrolyte composition of preceding paragraph 12, wherein the co-solvent comprises a carbonate moiety (—O—C(=O)—O—).

14. The electrolyte composition of any of preceding paragraphs 1-13,
wherein when the organosilicon includes a Si—O bond, and is formulated with 20 wt % ethylene carbonate co-solvent and 1M LiPF$_6$, it has a potential of at least about 5 V when current exceeds 1 mA/cm$^2$ in a three-electrode cell comprising a platinum working electrode, a lithium counter-electrode, and a Li/Li$^+$ reference electrode; and wherein when the organosilicon does not include a Si—O bond, and is formulated with 20 wt % ethylene carbonate co-solvent and 1M LiPF$_6$, it has a potential of at least about 6 V when current exceeds 1 mA/cm$^2$ in a three-electrode cell comprising a platinum working electrode, a lithium counter-electrode, and a Li/Li$^+$ reference electrode.

15. An electrolyte composition comprising at least one organosilicon and a lithium-containing salt, wherein the organosilicon is selected from the group consisting of:

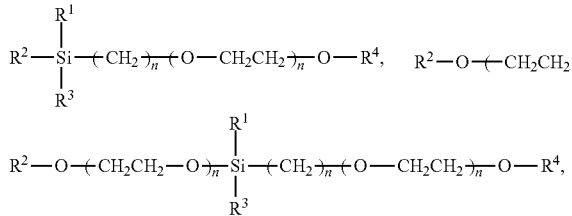 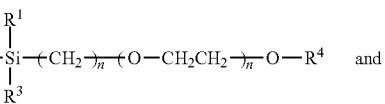

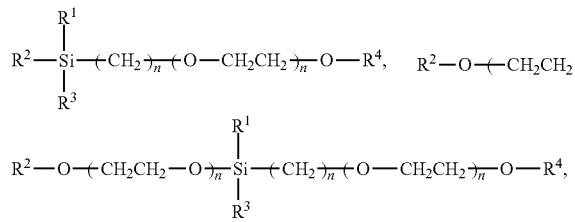

and combinations thereof,
wherein R$^1$, R$^2$, R$^3$, and R$^4$ are the same or different and are independently selected from the group consisting of C$_1$-C$_6$-linear, branched, or cyclic alkyl, and each "n" is independently an integer of from 1 to 15;
wherein the lithium-containing salt is selected from the group consisting of LiTFSI, LiPF$_6$, LiBOB, LiClO$_4$, LiBF$_4$, LiAsF$_6$, LiSbF$_6$, LiTaF$_6$, LiNbF$_6$, LiCF$_3$SO$_3$, LiC$_4$F$_9$SO$_3$, Li(FSO$_2$)$_2$N, Li(CF$_3$SO$_2$)$_2$N, Li(C$_2$F$_5$SO$_2$)$_2$N, Li(CF$_3$SO$_2$)$_3$C, LiBF$_3$(C$_2$F$_5$), LiB(C$_2$O$_4$)$_2$, LiB(C$_6$F$_5$)$_4$, LiPF$_3$(C$_2$F$_5$)$_3$, ½Li$_2$B$_{12}$F$_{12}$, and combinations thereof; and
wherein the lithium-containing salt is present in a concentration of from about 0.1 M to about 3.5 M.

16. The electrolyte composition of preceding paragraph 15, wherein the composition undergoes no more than about 10% thermal decomposition at a temperature of about 100° C. or less.

17. The electrolyte composition of any of preceding paragraphs 15 and 16, wherein the composition undergoes no more than about 20% thermal decomposition at a temperature of about 150° C. or less.

18. The electrolyte composition of any of preceding paragraphs 15-17, wherein the lithium-containing salt is selected from the group consisting of LiPF$_6$, LiBF$_4$, LiAsF$_6$, LiSbF$_6$, LiTaF$_6$, and LiNbF$_6$, and wherein the composition undergoes no more than about 20% thermal decomposition at a temperature of about 150° C. or less.

19. The electrolyte composition of any of preceding paragraphs 15-18, wherein the lithium-containing salt is LiPF$_6$.

20. The electrolyte composition of any of preceding paragraphs 15-19, further comprising a co-solvent.

21. The electrolyte composition of any of preceding paragraphs 15-20, wherein the co-solvent comprises a carbonate moiety (—O—C(═O)—O—).

22. The electrolyte composition of any of preceding paragraphs 15-21,
wherein when the organosilicon includes a Si—O bond, and is formulated with 20 wt % ethylene carbonate co-solvent and 1M LiPF$_6$, it has a potential of at least about 5 V when current exceeds 1 mA/cm$^2$ in a three-electrode cell comprising a platinum working electrode, a lithium counter-electrode, and a Li/Li$^+$ reference electrode; and
wherein when the organosilicon does not include a Si—O bond, and is formulated with 20 wt % ethylene carbonate co-solvent and 1M LiPF$_6$, it has a potential of at least about 6 V when current exceeds 1 mA/cm$^2$ in a three-electrode cell comprising a platinum working electrode, a lithium counter-electrode, and a Li/Li$^+$ reference electrode.

23. An electrolyte composition comprising at least one organosilicon and a lithium-containing salt selected from the group consisting of LiPF$_6$, LiBF$_4$, LiAsF$_6$, LiSbF$_6$, LiTaF$_6$, and LiNbF$_6$, wherein the organosilicon is selected from the group consisting of:

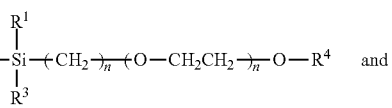

and combinations thereof,
wherein R$^1$, R$^2$, R$^3$, and R$^4$ are the same or different and are independently selected from the group consisting of C$_1$-C$_6$-linear, branched, or cyclic alkyl, and each "n" is independently an integer of from 1 to 15; and
wherein the composition undergoes no more than about 10% thermal decomposition at a temperature of about 100° C. or less.

24. The electrolyte composition of preceding paragraph 23, wherein the composition undergoes no more than about 20% thermal decomposition at a temperature of about 150° C. or less.

25. The electrolyte composition of any of preceding paragraphs 23 and 24, further comprising a co-solvent.

26. The electrolyte composition of any of preceding paragraphs 23-25, wherein the co-solvent comprises a carbonate moiety (—O—C(═O)—O—).

27. The electrolyte composition of any of preceding paragraphs 23-26,
wherein when the organosilicon includes a Si—O bond, and is formulated with 20 wt % ethylene carbonate co-solvent and 1M LiPF$_6$, it has a potential of at least about 5 V when current exceeds 1 mA/cm$^2$ in a three-electrode cell comprising a platinum working electrode, a lithium counter-electrode, and a Li/Li$^+$ reference electrode; and wherein when the organosilicon does not include a Si—O bond, and is formulated with 20 wt % ethylene carbonate co-solvent and 1M LiPF$_6$, it has a potential of at least about 6 V when current exceeds 1 mA/cm$^2$ in a three-electrode cell comprising a platinum working electrode, a lithium counter-electrode, and a Li/Li$^+$ reference electrode.

28. An electrochemical device comprising an electrolyte composition as recited in any of preceding paragraphs 1 through 14, inclusive.

29. An electrochemical device comprising an electrolyte composition as recited in any of preceding paragraphs 15 through 22, inclusive.

30. An electrochemical device comprising an electrolyte composition as recited in preceding paragraph 23 through 27, inclusive.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, 5, 6, from 1 to 9, from 3.6 to 4.6, from 3.5 to 9.9, and so forth.

All references to singular characteristics or limitations of the present invention shall include the corresponding plural characteristic or limitation, and vice-versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

The methods of the present invention can comprise, consist of, or consist essentially of the essential elements and limitations of the devices and methods described herein, as well as any additional or optional ingredients, components, or limitations described herein or otherwise useful in organosilicon chemistry, electrolyte/electrode design, and battery fabrication.

BRIEF DESCRIPTION OF THE DRAWINGS

FIG. 3A is a series of mass spectrograms at increasing temperatures for the vapor phase above 1NM3+1M LiTFSI. (No significant thermal degradation up to 150° C.) FIG. 3B is a series of mass spectrograms at increasing temperatures for the vapor phase above 1NM3+1M LiPF$_6$. (Salt-related decomposition is observed at 90° C.)

DETAILED DESCRIPTION

Figure 1:
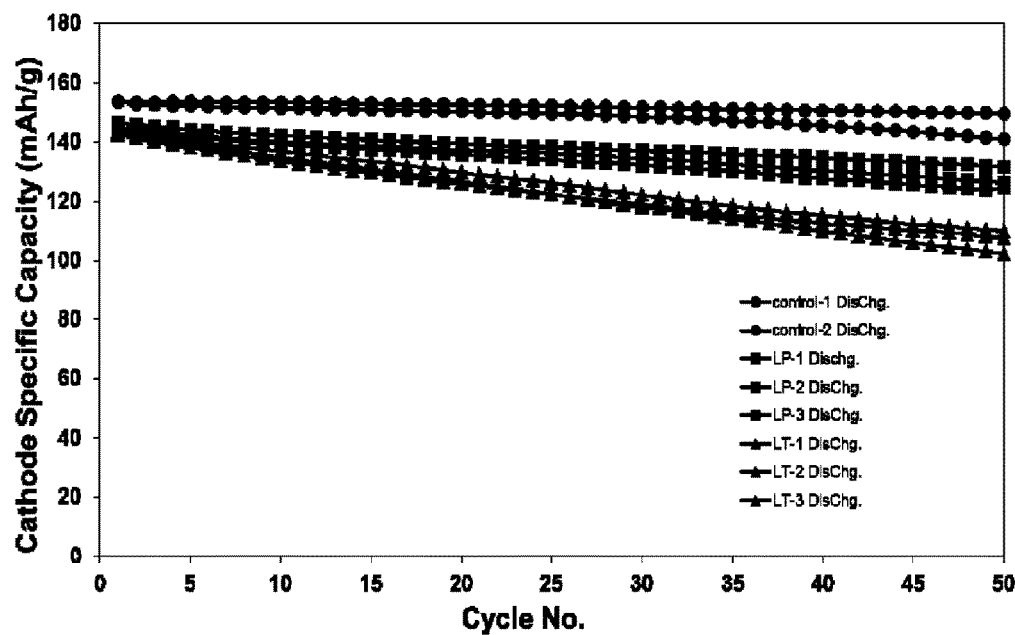
FIG. 1 is a cycling performance graph of the 1$^{st}$ generation OS compounds formulated with LiPF$_6$ and lithium bis(trifluoromethanesulfonyl)imide (LiTFSI) at 30° C. Key: ●=commercial carbonate control; ■=LiPF$_6$ ▲=LiTFSI. Cell Charge/Discharge Conditions: Coin Cell 2032; Cathode=NMC; Anode=Graphite; Charge=CCCV C/2 to 4.2V; Discharge=C/2 to 3.0V.

At the heart of the invention is an electrical device, such as a storage cell, battery, or any similar device configured for storing and controllably releasing electrical energy, including an anode and a cathode in combination with an electrolyte (solid, liquid, or gel) consisting of, consisting essentially of, or comprising an organosilicon molecule as described herein, wherein the electric current is carried (preferably) by lithium ions.

As used herein, the term "organosilicon electrolyte," designates a compound or mixture of compounds configured for use as an electrolyte in a cell or battery, comprising, consisting essentially of, or consisting of an organosilicon as described herein.

As noted above, disclosed herein are a series of organosilicon electrolytes (OS), some of which are symmetrical and some of which are unsymmetrical. Explicitly disclosed herein are unsymmetric OS molecules with a Si—O bond (i.e., no-spacer methylene units between the Si atom and the oxygen atom). Exemplary molecules included in this class of OS electrolytes are the following compounds:

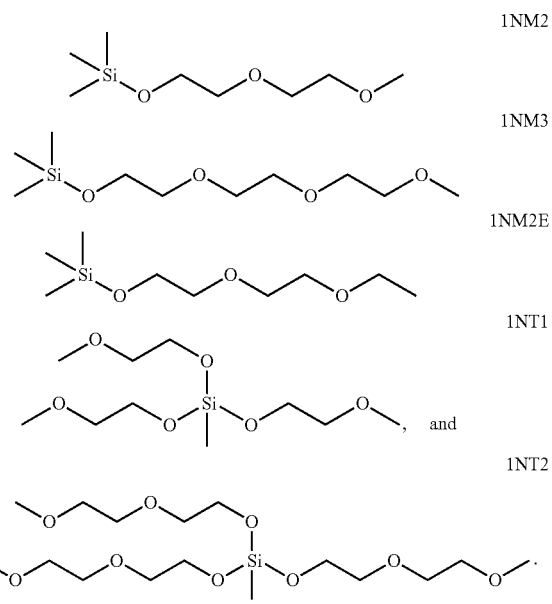

Also disclosed herein are symmetric molecules with a Si—O bond. Exemplary molecules included in this class of OS electrolytes are the following compounds:

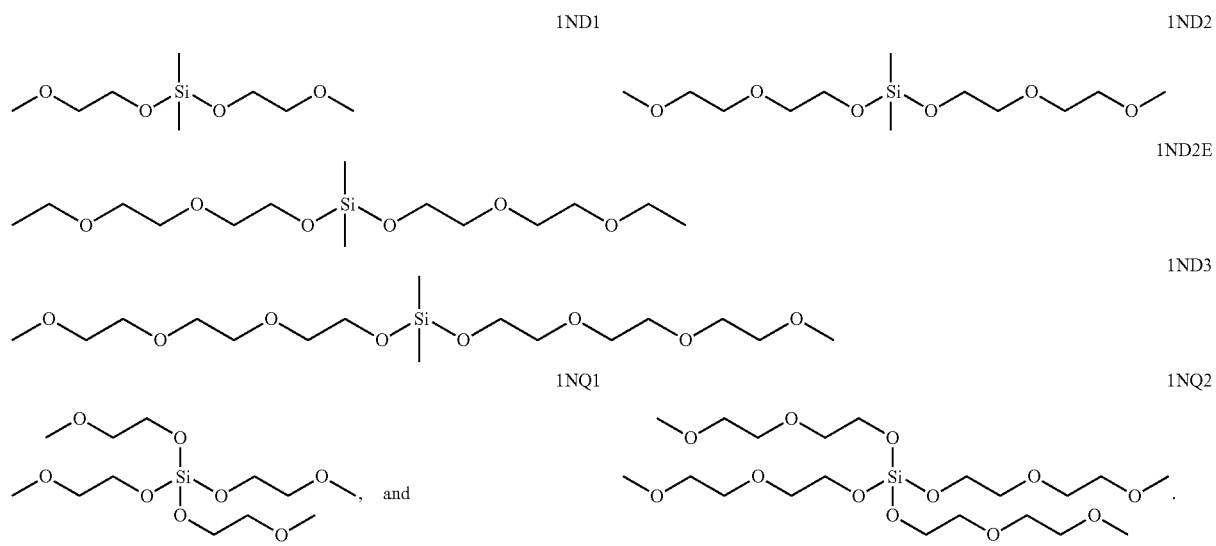

The preceding compounds are generically referred to herein as "1Nxx Compounds." All of these compounds share the structural feature of a direct Si—O bond. Table 1A presents selected physical properties of the 1Nxx series of compounds listed above. Table 1B compares the effect of the position of the Si molecule on the physical properties of 1NM3 vs 1ND2.

TABLE 1A

Physical Properties: 1Nxx Compounds

| Batch | OS | Molecular Weight | 30° C. Conductivity | 30° C. Viscosity | Flash Point |
|---|---|---|---|---|---|
| 2P383-01 | 1NM2 | 192 | 4.6 | 5.6 | 37 |
| BP565-01 | 1NM2E | 206 | 3.63 | 7.89 | 35 |
| CP630 | 1ND1 | 208 | 4.49 | 5.1 | 52 |
| NP384 | 1NM3 | 220 | 3.38 | 9 | 20 |
| XP729-02 | 1NT1 | 268 | 4.17 | 8 | 112 |
| CP597-20 | 1ND2 | 296 | 3.63 | 11.4 | 126 |
| XP762-01 | 1NQ1 | 328 | 3.34 | 12.1 | 122 |
| CP620-01 | 1ND2E | 329 | 2.96 | 22.8 | 132 |
| DP608-01 | 1ND3 | 385 | 1.84 | 25.4 | 123 |
| CP618-03 | 1NT2 | 401 | 2.31 | 15.9 | 146 |
| XP713-02 | 1NQ2 | 505 | 1.9 | 15.7 | 139 |

TABLE 1B

Physical Properties: 1NM3 versus 1ND2

| Batch | OS | Co-Solvent Salt | 30° C. Conductivity | 30° C. Viscosity | Flash Point |
|---|---|---|---|---|---|
| NT376 | 1NM3 | 20% EC 1M LiTFSI | 2.45 | 8.5 | 120 |
| NP384 | 1NM3 | 20% EC 1M LiPF$_6$ | 3.38 | 9 | 20 |
| CT402-02 | 1ND2 | 20% EC 1M LiTFSI | 3.65 | 8.65 | 132 |
| CP597-20 | 1ND2 | 20% EC 1M LiPF$_6$ | 3.63 | 11.4 | 126 |

Thermal Stability of the 1Nxx Compounds:

The 1Nxx Compounds were tested for their thermal stability, as summarized in Table 2, below. The vapor phase decomposition products generated at different temperatures were assayed via mass spectrometry. The thermal stabilities were compared and contrasted in the presence and absence of various lithium-containing salts. The comparisons of thermal stability can be summarized by reference to the structural features of the 1Nxx Compounds: Parent Groups are OS's with three glycol units and a Si—O bond and are exemplified by 1NM3 and 1ND3. OS's with two glycol units and a Si—O bond are exemplified by 1NM2, 1ND2, 1NT2, and 1NQ2. OS's with only one glycol unit and a Si—O bond are exemplified by 1ND1, 1NT1, and 1NQ1. Other OS's that include bulky groups affixed to the terminal methoxy group are exemplified by 1NM2E and 1ND2E.

TABLE 2

Summary of Thermal Stability, 1Nxx Compounds with 1M LiPF$_6$

| OS | Temperature at Initiation of Gas Release (° C.) | Maximum Temperature (° C.) | Extent of Decomposition at Max Temperature (liq. $^1$H NMR) |
|---|---|---|---|
| 1ND1 | 70 | 100 | 70-90% |
| 1NT1 | 125 | 125 | 60% |
| 1NQ1 | 125 | 175 | 25-50%* |
| 1NM2 | 55 | 100 | ≈100% |
| 1NM2E | 100 | 100 | >97% |
| 1ND2 | 125 | 125 | ≈100% |
| 1ND2E | 125 | 125 | >99% |
| 1NT2 | 150 | 150 | ≈100% |
| 1NQ2 | 150 | 175 | ≈100% |
| 1NM3 | 100 | 100 | ≈100% |
| 1ND3 | 125 | 125 | >90% |

*1M LiPF$_6$ electroyte does not contain enough fluorine for 100% decomposition; 3M LiPF$_6$ electrolyte with 1NQ1 will decompose 100%

A number of general trends can be gleaned from Table 2: Increasing the number of glycol substituents on the silicon atom tends to increase the thermal stability (i.e. lowers reactivity) in the presence of LiPF$_6$ salt (and its PF$_5$/HF equilibrium products). Increasing the glycol chain length also tends to increase thermal stability, but to a lesser extent than the number of glycol substituents. Adding bulkier groups to the terminal methoxy group of the glycol chain tends to increase thermal stability for OS's having only one glycol unit, but not for OS's with two glycol units. In general, both unsymmetric and symmetric OS molecules with a Si—O bond tend to decompose completely with LiPF$_6$ once the reaction initiation temperature is reached.

Figure 4:
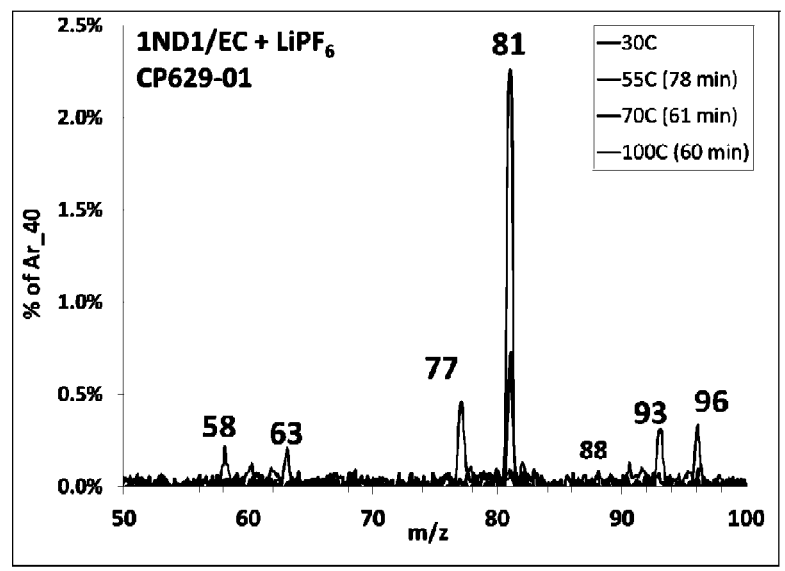
FIG. 4 is a mass spectrograph depicting the vapor phase thermal decomposition products of 1ND1+1M LiPF$_6$. Gas phase products are first observed at 70° C.

1ND1+1M LiPF$_6$ Thermal Stability (FIG. 4): As shown in FIG. 4, 1ND1+LiPF$_6$ decomposition begins at about 70° C. The primary degradation products are 1,4-dioxane and (CH$_3$)$_2$SiF$_2$ (both gases), and F1NM1 (which is a liquid, see structure below):

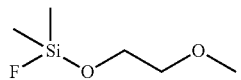

From roughly 50-100 m/z, 1ND1 yields the same fragments as does 1ND2: Me$_2$SiF$_2$ (96 m/z) and 1,4-dioxane (88 m/z). However, different peaks are observed from 100-150 m/z. The peaks at 137/107 m/z are likely fragments of F1NM1. NMR analysis (data not shown) revealed that 70 wt % of the 1ND1 in the presence of 1 M LiPF$_6$ decomposes to F1NM1 (according to the MeSi peak in the OS $^1$H NMR spectrum). 1ND1 is less thermally stable than 1ND2 (reaction initiation temperature=70° C. vs. 125° C.) in the presence of 1 M LiPF$_6$.

Figure 5:
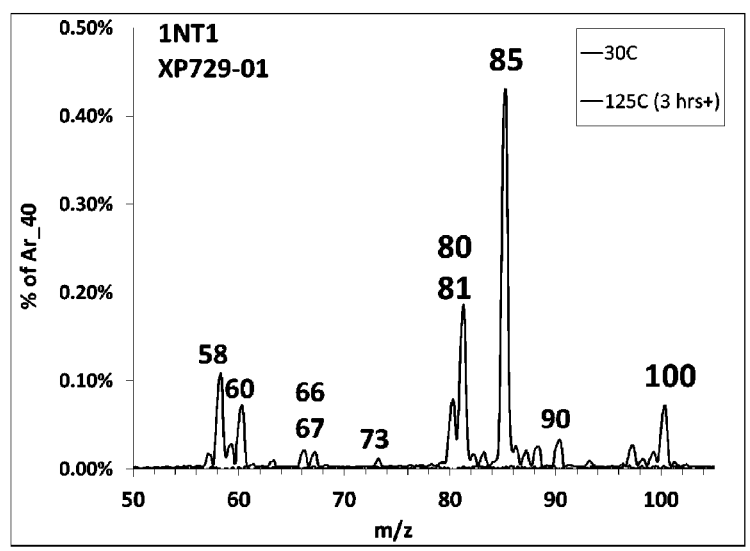
FIG. 5 is a mass spectrograph depicting the vapor phase thermal decomposition products of 1NT1+1M LiPF$_6$ at 125° C. No gas phase products are observed below 125° C.

1NT1+1M LiPF$_6$ Thermal Stability (FIG. 5): As shown in FIG. 5, the thermal decomposition of 1NT1 tends to be controlled or influenced by both temperature and the amount of salt added. The salt concentration directly controls the amount of fluorine available for reaction with the OS molecule. Vigorous decomposition (i.e., quick generation of significant amounts of gas phase decomposition products) was observed at 125° C. $^1$H NMR (data not shown) revealed that 62.5% of the 1NT1 has decomposed (according to the MeSi peak in the $^1$H NMR spectrum). The major decomposition products are the liquid phase products F1ND1 (23%), DF1NM1 (13%), hydrolysis products (<5%), and other products (21.5%), including the gas phase product trifluoromethylsilane (CH$_3$SiF$_3$). The structures of F1ND1 and DF1ND1 are:

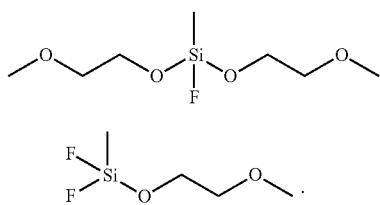

Figure 6:
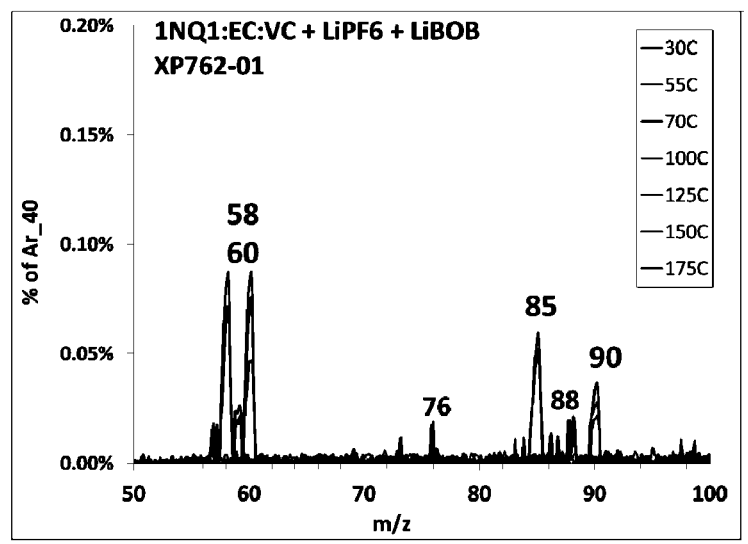
FIG. 6 is a mass spectrograph depicting the vapor phase thermal decomposition products of 1NQ1+ethylene carbonate ("EC") and vinylene carbonate ("VC") in the presence of 1M LiPF$_6$ and lithium bis(oxalato)borate ("LiBOB") at 175° C. Gas phase products are first observed at 125° C.

1NQ1+1M LiPF$_6$ Thermal Stability (FIG. 6): As shown in FIG. 6, 1NQ1 yielded gaseous products at about 125° C., but does not undergo vigorous reaction (i.e., quick generation of significant amounts of gas phase decomposition products) up to 175° C. $^1$H NMR (data not shown) showed that about 25-50% of 1NQ1 is decomposed at 175° C. Interestingly, 100% of the fluorine in the decomposition products is bound to silicon, and 100% of the phosphorous in the decomposition products is bound to oxygen. There is insufficient fluorine in 1M LiPF$_6$ for 100% 1NQ1 decomposition (1NQ1=2.4M, 9.6M F needed for complete decomposition). Gas phase products observed at 125° C. included 1,4-dioxane and SiF$_4$.

Figure 7:
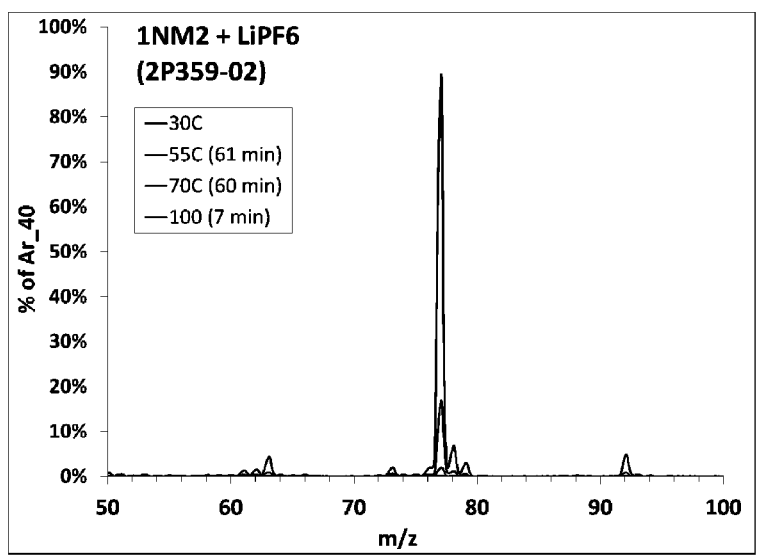
FIG. 7 is a mass spectrograph depicting the vapor phase thermal decomposition products of 1NM2+1M LiPF$_6$. Gas phase decomposition products are first observed at 55° C. with increasing intensity at 70° C. and 100° C.

1NM2+1M LiPF$_6$ Thermal Stability (FIG. 7): As shown in FIG. 7, initial decomposition was seen at 55° C., with complete reaction occurring at 100° C. In the 50-100 m/z range, the decomposition products of 1NM2 were the same as for those of 1NM3 (principally (CH$_3$)$_3$SiF, 92 m/z). $^1$H NMR (data not shown) revealed that 1NM2 is almost 100% decomposed through cleavage of the Si—O bond, based on the MeSi peak in the $^1$H NMR spectrum. The decomposition reaction at 100° C. is vigorous and analogous to the other 1Nx2 structures.

Figure 8:
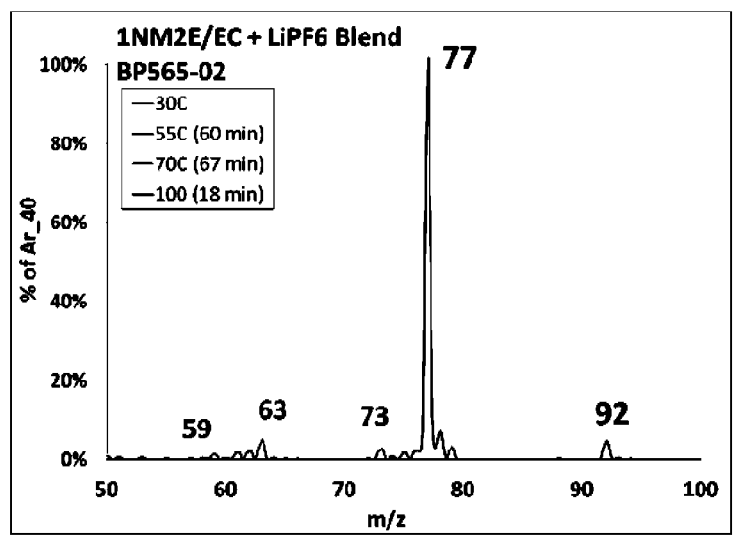
FIG. 8 is a mass spectrograph depicting the vapor phase thermal decomposition products of 1NM2E/EC+1M LiPF$_6$ at 100° C. Gas phase decomposition is not observed below 100° C.

1NM2E+1M LiPF$_6$ Thermal Stability (FIG. 8): As shown in FIG. 8, 1NM2E+LiPF$_6$ decomposes vigorously at 100° C. However, no decomposition reaction was observed at T≤100° C. The primary gas phase product is same as for 1NM2, namely (CH$_3$)$_3$SiF (92 m/z) with low levels of 1,4-dioxane. Thus, 1NM2E increases the gas product initiation temperature to 100° C. as compared to 1NM2. In this regard, 1NM2E behaves similarly to 1NM3.

Figure 9:
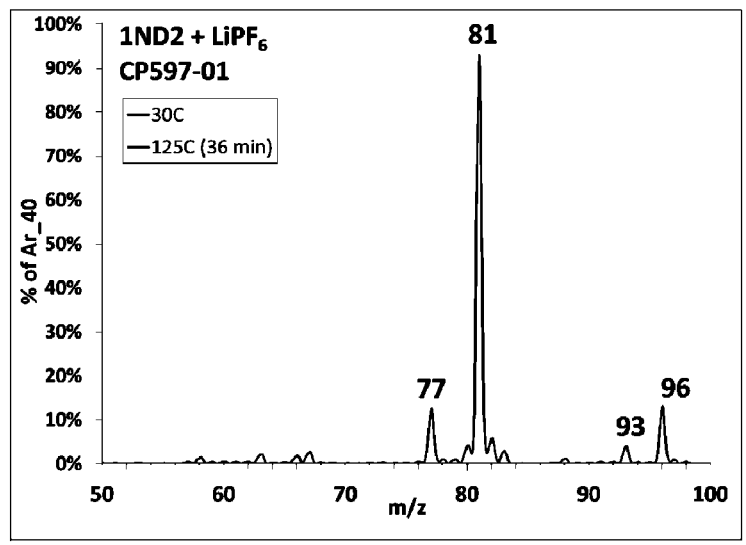
FIG. 9 is a mass spectrograph depicting the vapor phase thermal decomposition products of 1ND2+1M LiPF$_6$ at 125° C. Gas phase decomposition is not observed below 125° C.

1ND2+1M LiPF$_6$ Thermal Stability (FIG. 9): As shown in FIG. 9, 1ND2+1M LiPF$_6$ reacts vigorously at 125° C. (versus 70° C. for 1NM2). No decomposition reaction was observed at T≤125° C. The primary reaction byproduct is (CH$_3$)$_2$SiF$_2$ (96 m/z) with a small amount of 1,4-dioxane. $^1$H NMR (data not shown) revealed ≈100% decomposition according to the MeSi peak in the $^1$H NMR spectrum.

Figure 10:
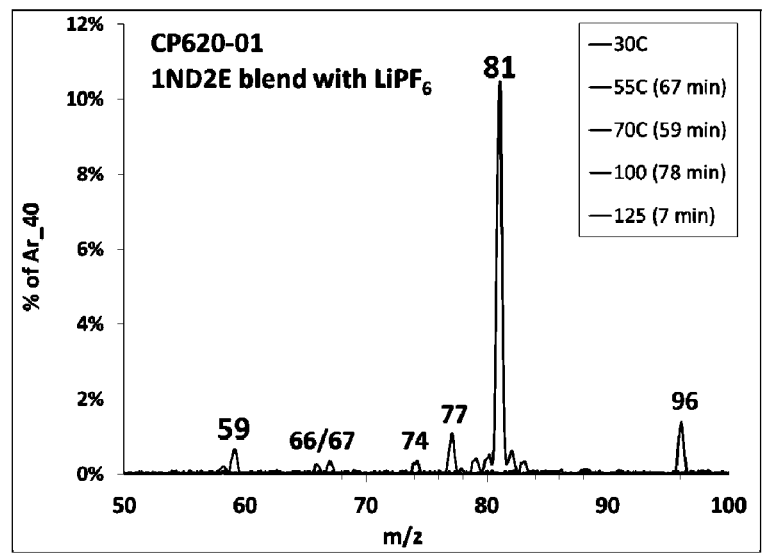
FIG. 10 is a mass spectrograph depicting the vapor phase thermal decomposition products of 1NT1+1M LiPF$_6$ at 125° C. Gas phase decomposition is not observed below 125° C.

1ND2E+1M LiPF$_6$ Thermal Stability (FIG. 10): As shown in FIG. 10, 1ND2E+LiPF$_6$ decomposition occurs at about 125° C. The primary decomposition product is (CH$_3$)$_2$SiF$_2$ (96 m/z). $^1$H NMR analysis (data not shown) revealed <1% 1ND2E remaining in the liquid. The liquid byproduct was comprised of about 81% F1NM2E (81% of the MeSi peak signal).

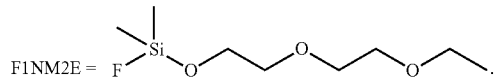

Figure 11:
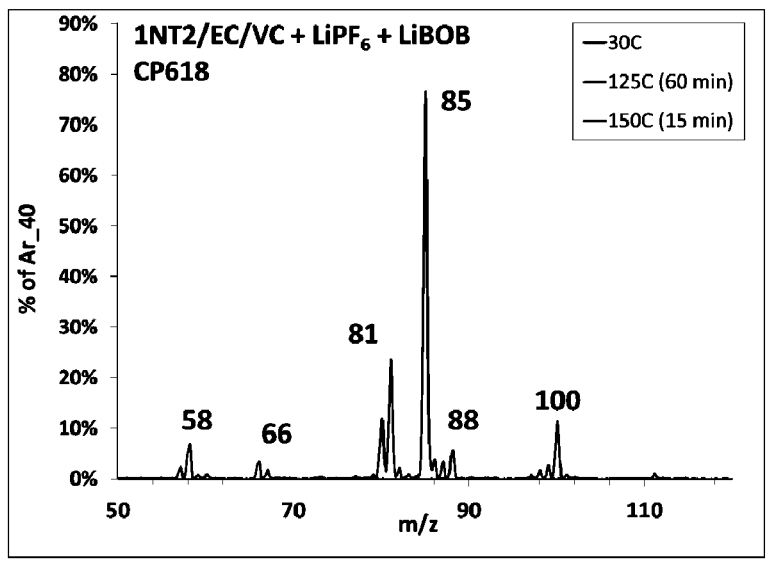
FIG. 11 is a mass spectrograph depicting the vapor phase thermal decomposition products of 1NT2/EC/VC+1M LiPF$_6$ and 1M LiBOB at 150° C. Gas phase decomposition is not observed below 150° C.

1NT2+1M LiPF$_6$ Thermal Stability (FIG. 11): As shown in FIG. 11, 1NT2+LiPF$_6$ reacts vigorously at 150° C. (vs. 70° C. for 1NM2 and 125° C. for 1ND2). The primary byproduct is (CH$_3$)SiF$_3$ with peaks observed at 100, 85, 81, and 66 m/z in the mass spectrum. The secondary product is 1,4-dioxane with peaks observed at 88 and 58 m/z. Increasing the number of glycol substituents on the silicon atom increases the thermal stability (i.e., 1NT2 decomposes at 150° C., 1ND2 decomposes at 125° C.).

Figure 12:
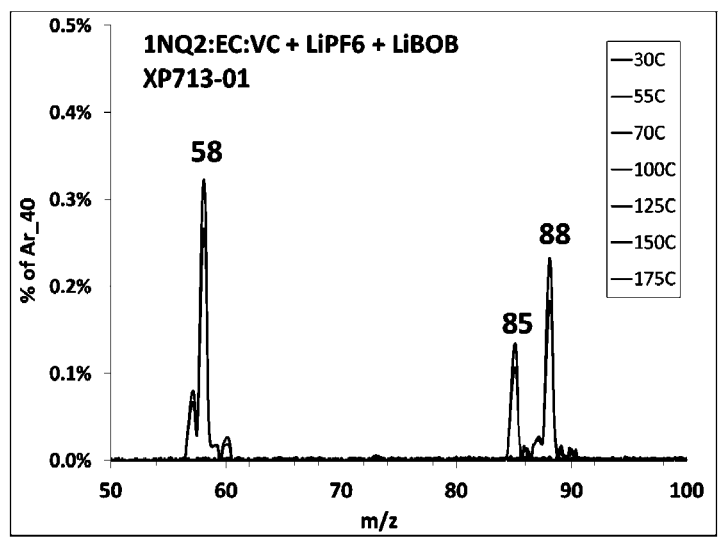
FIG. 12 is a mass spectrograph depicting the vapor phase thermal decomposition products of 1NQ2/EC/VC+1M LiPF$_6$ and 1M LiBOB at 175° C. Gas phase products are first observed at 125° C.

1NQ2+1M LiPF$_6$ Thermal Stability (FIG. 12): As shown in FIG. 12, decomposition was initially observed at 150° C., but no increase in decomposition was seen at 175° C. $^1$H NMR (data not shown) indicated that 1NQ2 is ≈100% decomposed based on the $^1$H NMR peaks associated with the glycol region. $^{19}$F NMR (data not shown) revealed that <0.5% LiPF$_6$ remains. Thus, 1NQ2 decomposes at about 150° C. in the presence of 1M LiPF$_6$, but the decomposition reaction is not vigorous like other 1Nx2 structures, likely due to insufficient fluorine present in a 1M LiPF$_6$ electrolyte to fully decompose the 1NQ2 molecule).

Figure 13:
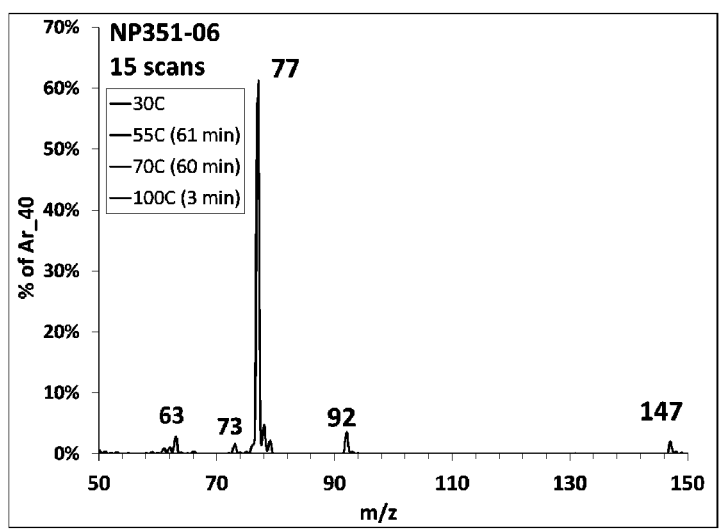
FIG. 13 is a mass spectrograph depicting the vapor phase thermal decomposition products of 1NM3+1M LiPF$_6$ at 100° C. Gas phase decomposition products are not observed below 100° C.

1NM3+1M LiPF$_6$ Thermal Stability (FIG. 13): As shown in FIG. 13, 1NM3+1M LiPF$_6$ decomposes completely at 100° C. In the 50-100 m/z range, the reaction fragments are the same as for 1NM2, principally Me$_3$SiF (92 m/z). $^1$H NMR (data not shown) revealed that 1NM3 is ≈100% decomposed based on the MeSi peak in the $^1$H NMR spectrum. Thus, 1NM3 decomposes at 100° C. and the decomposition reaction is vigorous in the same fashion as other 1Nx2 or 1Nx3 structures.

Figure 14:
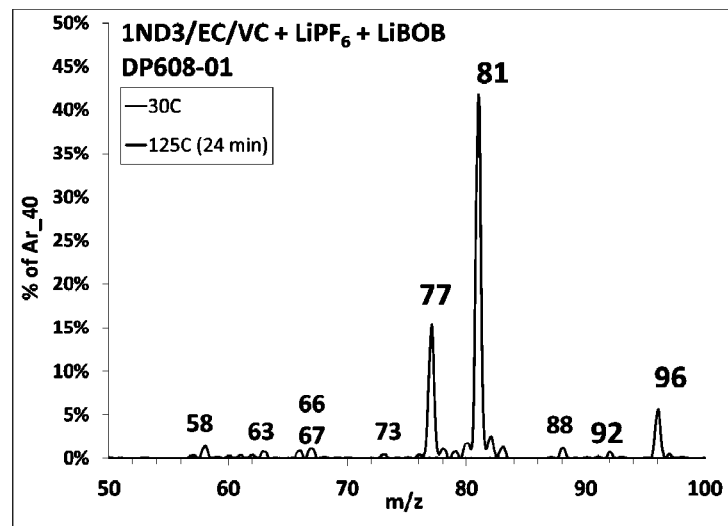
FIG. 14 is a mass spectrograph depicting the vapor phase thermal decomposition products of 1ND3/EC/VC+1M LiPF$_6$ and 1M LiBOB at 125° C. Gas phase decomposition products are not observed below 125° C.

1ND3+1M LiPF$_6$ Thermal Stability (FIG. 14): As shown in FIG. 14, 1ND3 in the presence of 1M LiPF$_6$ reacts at about 125° C. The products include those observed for other 1Nxx Compounds, including (CH$_3$)$_2$SiF$_2$ (molecular ion=96 m/z) and 1,4-dioxane (molecular ion=88 m/z). $^1$H NMR (data not shown) indicates ≈100% decomposition at 125° C. The reaction is vigorous and similar to 1ND2.

Figure 15:
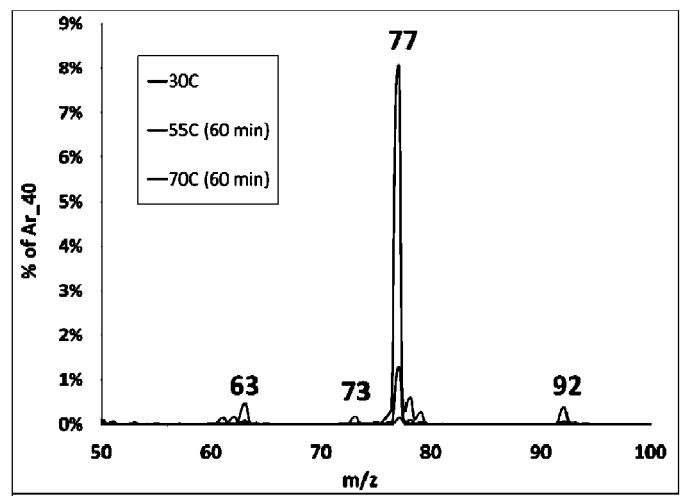
FIG. 15 is a mass spectrograph depicting the vapor phase thermal decomposition products of 1NM3+1M LiBF$_4$ at 70° C. Gas phase decomposition products are first observed at 30° C.
Figure 16:
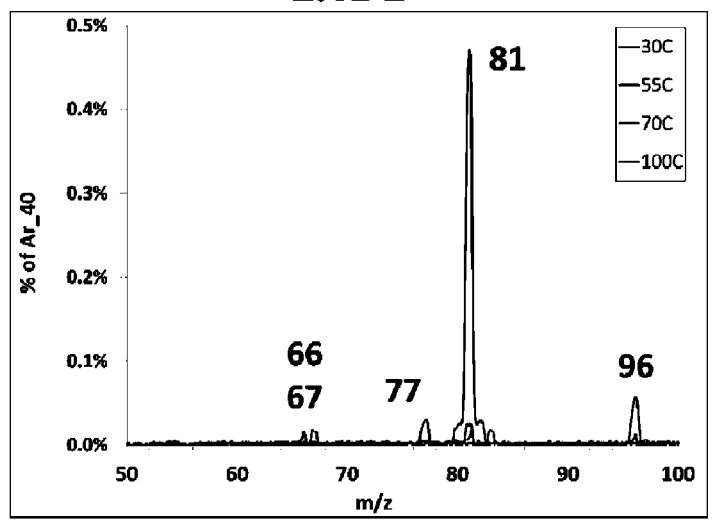
FIG. 16 is a mass spectrograph depicting the vapor phase thermal decomposition products of 1ND1+1M LiBF$_4$. Gas phase decomposition products are first observed at 55° C.
Figure 17:
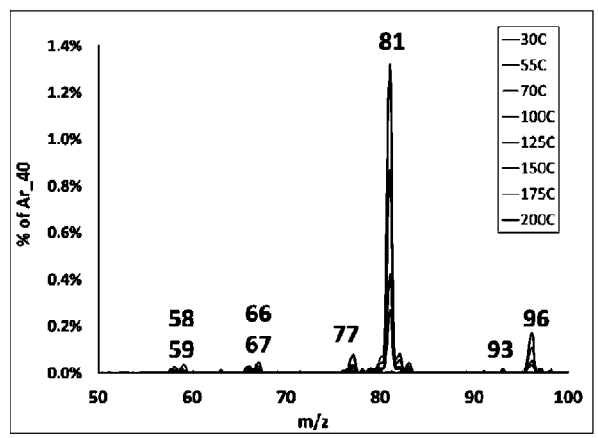
FIG. 17 is a mass spectrograph depicting the vapor phase thermal decomposition products of 1ND2+1M LiBF$_4$ at 200° C. Gas phase decomposition products are first observed at 100° C.

1NM3+1M LiBF$_4$ (FIG. 15), 1ND1+1M LiBF$_4$ (FIG. 16), and 1ND2+1M LiBF$_4$ Thermal Stability (FIG. 17): As shown in FIGS. 15, 16, and 17, representative 1Nxx Compounds 1NM3, 1ND1, and 1ND2 are less thermally stable in the presence of LiBF$_4$ as compared to LiPF$_6$. The decomposition products, however, are identical to those produced with LiPF$_6$. Significant decomposition with LiBF$_4$ occurs at room temperature for all 1Nxx structures, unlike with LiPF$_6$. The extent of decomposition does not increase significantly with heating. With LiBF$_4$, there is less fluorine available for reaction and when the fluorine is consumed the reaction ceases.

TABLE 3

Comparison of Thermal Stability in 1M LiPF$_6$ versus LiBF$_4$

| | After Heating with LiPF$_6$ | | | After Heating with LiBF$_4$ | | |
|---|---|---|---|---|---|---|
| Solvent | $T_{decomp}$ (° C.) | $T_{final}$ (° C.) | % Decomp | $T_{decomp}$ (° C.) | $T_{final}$ (° C.) | % Decomp |
| 1NM3 | 100 | 100 | 100% | 30 | 70 | 100% |
| 1ND1 | 70 | 100 | 70-90% | 55 | 100 | 99% |
| 1ND2 | 125 | 125 | 100% | 100 | 200 | 86% |

Electrochemical Stability of the 1Nxx Compounds:

In the same fashion as for thermal stability, the comparisons of electrochemical stability can be summarized by reference to the structural features of the 1Nxx Compounds: Parent OS's with three glycol units and a Si—O bond are exemplified by 1NM3 and 1ND3. OS's with two glycol units and a Si—O bond are exemplified by 1NM2, 1ND2, 1NT2, and 1NQ2. OS's with only one glycol unit and a Si—O bond are exemplified by 1ND1, 1NT1, and 1NQ1. Other OS's that include other alkyl groups affixed to the terminal oxygen on the glycol chain are exemplified by 1NM2E and 1ND2E.

Electrochemical stability was assayed in test cells comprising 20% ethylene carbonate ("EC") co-solvent and 1M LiPF$_6$. Oxidative stability was evaluated in a 3-electrode cell using a Pt working electrode and a Li/Li$^+$ reference electrode. The cell potential when the current exceeded 1 mA/cm$^2$ was quantified. This is a common analysis found in electrochemical literature, and well-known to those skilled in the battery field. The results are summarized in Table 4. In general, OS molecules with Si—O bonds ("non-spacer") have similar oxidative stability behavior regardless of the length of the glycol chain (e.g., 1Nx1 vs. 1Nx2 vs. 1Nx3). Improvement in the oxidative stability was observed for the "non-spacer" OS molecules with four glycol chains on the silicon atom only for OS molecules with a single glycol unit.

TABLE 4

Electrochemical Stability with 20% EC co-solvent and 1M LiPF$_6$

| Solvent | Potential at 1 mA/cm$^2$ |
|---|---|
| 1ND1 | 5.1 V |
| 1NT1 | 5.2 V |
| 1NQ1 | 6.3 V |
| 1NM2 | 5.2 V |
| 1ND2 | 5.3 V |
| 1ND2E | 5.2 V |
| 1NT2 | 5.3 V |
| 1NQ2 | 5.3 V |

TABLE 4-continued

Electrochemical Stability with 20% EC co-solvent and 1M LiPF$_6$

| Solvent | Potential at 1 mA/cm$^2$ |
|---|---|
| 1NM3 | 5.1 V |
| 1ND3 | 5.4 V |
| EC:DEC | 6.5 V |

Figure 18A:
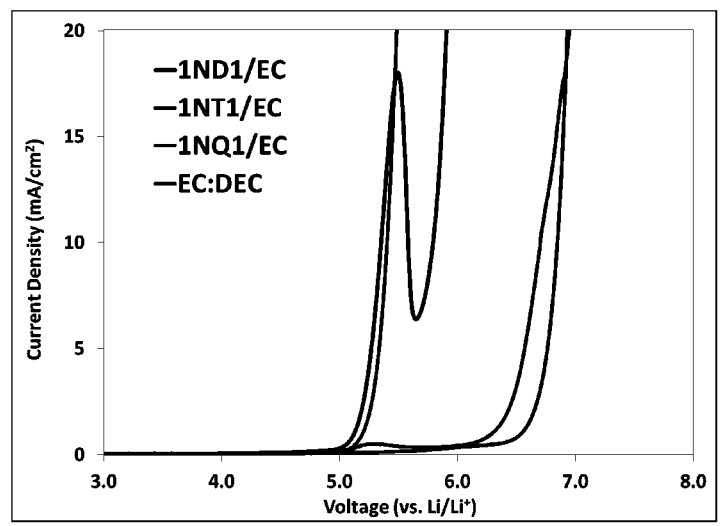
FIG. 18A together with FIG. 18B depicts oxidative stability of 1ND1, 1NT1, and 1NQ1 with 1M LiPF$_6$ with 20 wt % ethylene carbonate (EC) co-solvent.
Figure 18B:
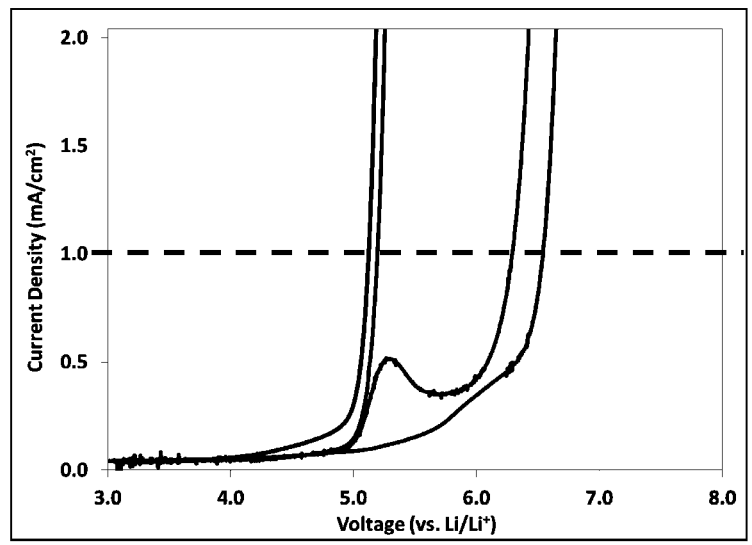
FIG. 18B together with FIG. 18A depicts oxidative stability of 1ND1, 1NT1, and 1NQ1 with 1M LiPF$_6$ with 20 wt % ethylene carbonate (EC) co-solvent. Data were gathered using a three-electrode linear sweep with a platinum working electrode (WE), a lithium counter electrode (CE), and a Li/Li+ reference electrode (RE).

1ND1 vs. 1NT1 vs. 1NQ1 (all with 20% EC co-solvent), Oxidative Stability (FIGS. 18A and 18B): As shown in FIGS. 18A and 18B, OS molecules with a Si—O bond and 1 glycol unit show reduced oxidative stability in 20% EC blend as compared to the ethylene carbonate/diethyl carbonate (EC:DEC) control electrolyte with 1M LiPF$_6$. Additionally, improved oxidative stability was observed for the "non-spacer" OS molecules with four glycol chains on the silicon atom (1ND1=1NT1<1NQ1) in the presence of LiPF$_6$.

Figure 19A:
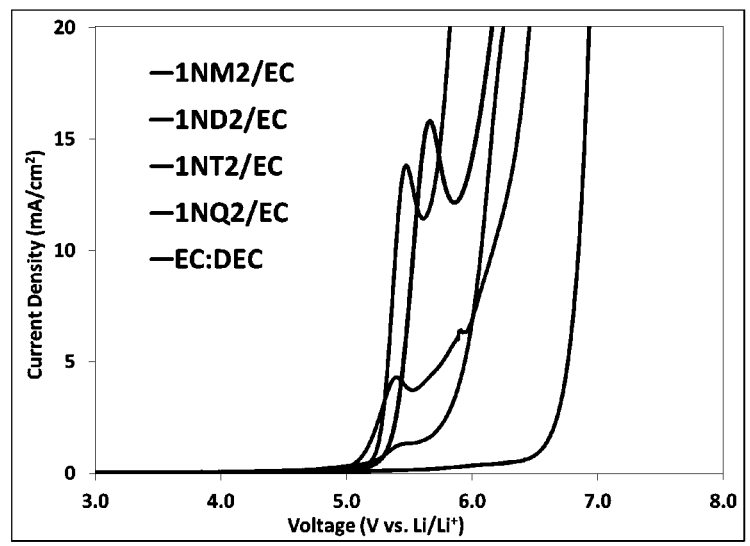
FIG. 19A together with FIG. 19B depicts oxidative stability of 1NM2, 1ND2, and 1NT2 with 1M LiPF$_6$ with 20 wt % ethylene carbonate (EC) co-solvent.
Figure 19B:
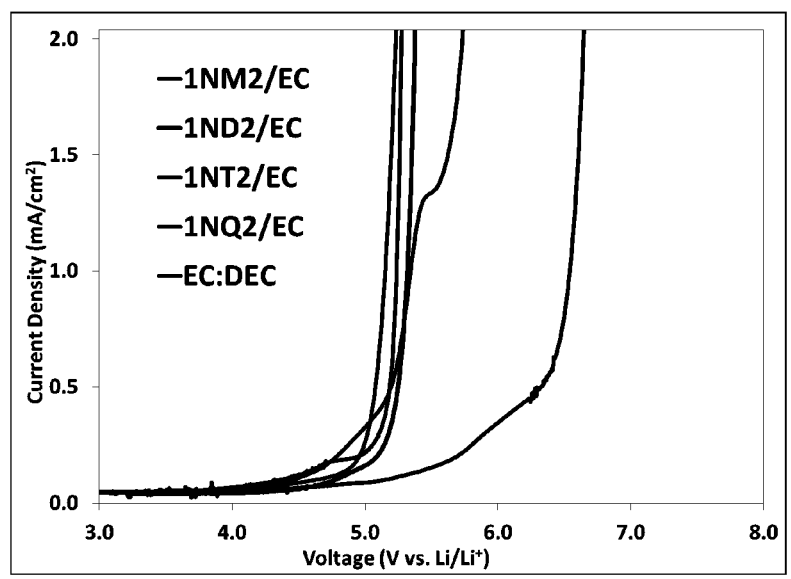
FIG. 19B together with FIG. 19A depicts oxidative stability of 1NM2, 1ND2, and 1NT2 with 1M LiPF$_6$ with 20 wt % ethylene carbonate (EC) co-solvent. Data were gathered using the three-electrode linear sweep described for FIG. 18B.

1NM2 vs. 1ND2 vs. 1NT2 vs. 1NQ2 (with 20% EC co-solvent), Oxidative Stability (FIGS. 19A and 19B): In FIGS. 19A and 19B, the oxidative stability of four compounds, 1NM2, 1ND2, 1NT2, and 1NQ2 are compared. Here, the figures show that non-spacer OS molecules with a Si—O bond and two glycol units tend to have reduced oxidative stability in 20% EC blend compared to the EC:DEC electrolyte. Overall, though, the data show that oxidative stability is not greatly affected by number of glycol substituents on the Si atom.

Figure 20A:
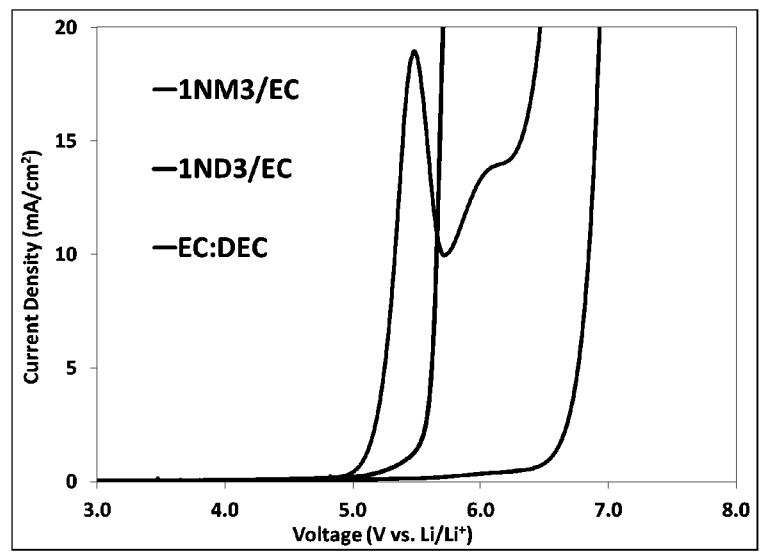
FIG. 20A together with FIG. 20 depicts oxidative stability of 1NM3 and 1ND3 with 1M LiPF$_6$ with 20 wt % ethylene carbonate (EC) co-solvent.
Figure 20B:
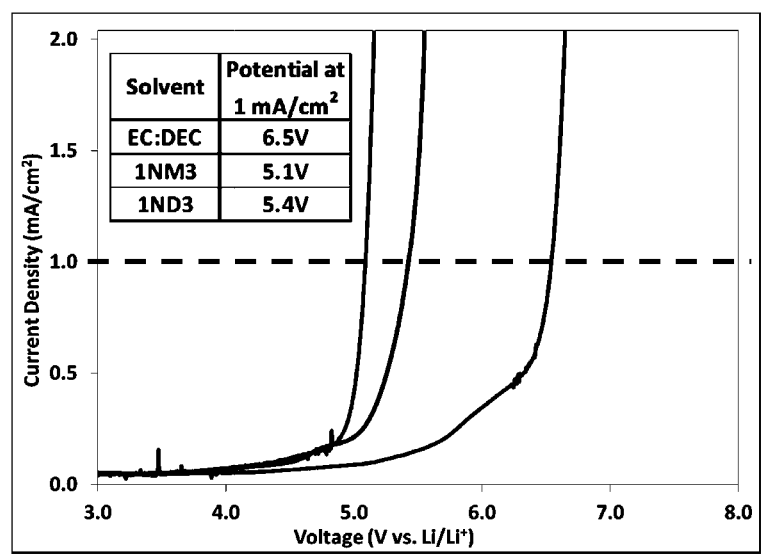
FIG. 20B together with FIG. 20A depicts oxidative stability of 1NM3 and 1ND3 with 1M LiPF$_6$ with 20 wt % ethylene carbonate (EC) co-solvent. Data were gathered using the three-electrode linear sweep described for FIG. 18B.

1NM3 vs. 1ND3 (with 20% EC co-solvent), Oxidative Stability (FIGS. 20A and 20B): In these two figures, the non-spacer compounds 1NM3 and 1ND3 are compared. These are representative of non-spacer OS molecules having three glycol units. The data shows that these types of compounds tend to have reduced oxidative stability in 20% EC blend compared to the EC:DEC control electrolyte regardless of the number of glycol chains.

Also disclosed herein are symmetric and unsymmetric OS molecules that lack a Si—O bond (i.e., there is a spacer alkylenyl moiety between the Si atom and the oxygen atom). These compounds are generically referred to herein as "spacer molecules." Exemplary spacer molecules included in this class of OS electrolytes are the following compounds:

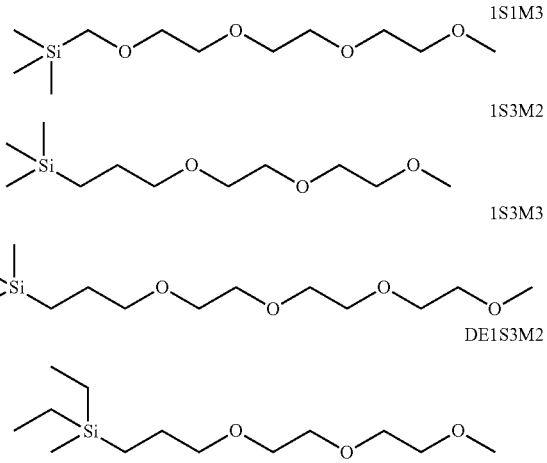

-continued

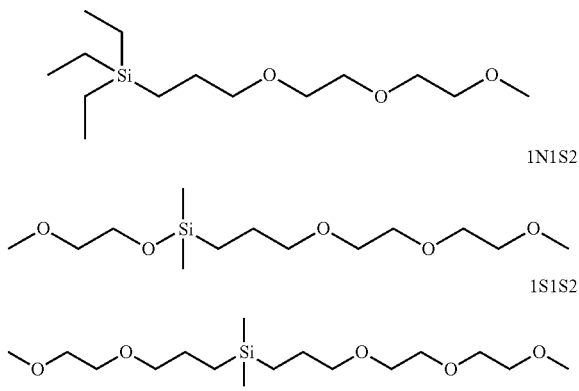

TE1S3M2

1N1S2

1S1S2

Table 5 provides a summary of selected physical properties of these compounds. Table 6A provides a summary of the thermal stability of these compounds. Table 6B tabulates the effect of the number of spacer methylenes on the physical properties recited in Table 5 for representative spacer compounds 1NM3 (no spacer methylene units), 1S1M3 (one spacer methylene unit), and 1S3M3 (three spacer methylene units).

TABLE 5

Selected Physical Properties of Spacer Molecules

| Batch | OS | Molecular Weight | 30° C. Conductivity | 30° C. Viscosity | Flash Point |
|---|---|---|---|---|---|
| XP656-01 | 1S3M2 | 234 | 2.88 | 15.2 | 82 |
| XP601-02 | DE1S3M2 | 262 | 2.42 | 15.8 | 105 |
| XP523 | 1S3M3 | 281 | 2.37 | 18.1 | 129 |
| XP634-01 | 1N1S2 | 294 | 1.09 | 12.8 | 22 |
| XP621-01 | TE1S3M3 | 300 | 1.06 | 37.3 | 119 |
| XP638-01 | 1S1S2 | 337 | 1.16 | 32.7 | 128 |

TABLE 6A

Thermal Stability of Spacer Molecules

| OS | Temperature at initiation of Gas Release (° C.) | Maximum Temperature (° C.) | Extent of Decomposition at Max Temperature (liq. $^1$H NMR) |
|---|---|---|---|
| 1S3M2 | 100 | 150 | 2% |
| 1S3M3 | 100 | 150 | 3% |
| DE1S3M2 | 125 | 150 | 5% |
| TE1S3M2 | 125 | 150 | 7-8% |
| 1N1S2 | 70 | 100 | 99.5% |
| 1S1S2 | 150 | 150 | 16% |

Referring to Table 6A, note that adding a three-methylene spacer between the Si and O atoms significantly increases thermal stability of the electrolyte in the presence of LiPF$_6$. Also apparent from Table 6A is a significant reduction in extent of OS decomposition (2-3% vs. 50-100%) and formation of gas phase products when a three-methylene spacer is introduced. Electrolytes with a direct Si—O bond tend to react to completion quickly once the decomposition reaction is initiated and produce gaseous products. In contrast, the spacer OS do not react quickly and yield few or no gaseous products.

Generally, increasing the glycol chain length has no significant effect on the thermal stability of the spacer compounds. However, adding bulkier groups to the Si atom (such as in compounds DE1S3M2, TE1S3M2) results in 25° C. delay in initiation of gas production.

In general, OS molecules with a methylene spacer unit do not undergo complete decomposition with LiPF$_6$ at temperatures up to about 150° C. The thermal stability of unsymmetric compounds that have one substituent with a three methylene spacer unit and one substituent without a methylene spacer unit tends to be determined by the less stable "non-spacer" group. That is, these unsymmetric molecules with multiple substituents where at least one substituent does not have the methylene spacer unit behave more in the fashion of non-spacer compounds, at least with respect to thermal stability.

TABLE 6B

Effect of Number of Spacer Methylenes on Physical Properties: 1NM3 vs 1S$_1$M3 vs 1S$_3$M3

| Batch | OS | Salt | 30° C. Conductivity | 30° C. Viscosity | Flash Point ° C. |
|---|---|---|---|---|---|
| NT376 | 1NM3 | 20% EC 1M LiTFSI | 2.45 | 8.5 | 120 |
| XT529 | 1S1M3 | 20% EC 1M LiTFSI | 2.99 | 9.8 | 120 |
| XT528 | 1S3M3 | 20% EC 1M LiTFSI | 1.93 | 16.2 | 136 |
| NP384 | 1NM3 | 20% EC 1M LiPF6 | 3.38 | 9 | 20 |
| XP523 | 1S3M3 | 20% EC 1M LiPF6 | 2.366 | 18.1 | 129 |

Figure 21:
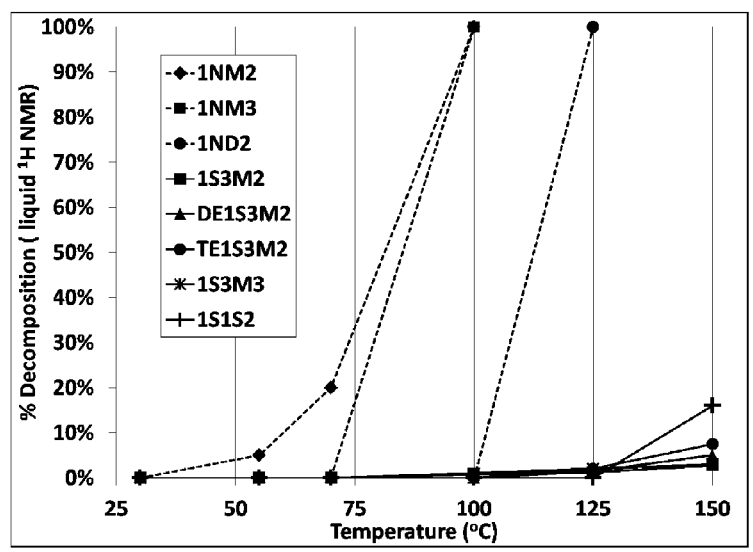
FIG. 21 is a graph depicting percent decomposition versus temperature for a series of organosilicon electrolytes. Data with solid lines show the enhanced thermal stability for OS electrolytes comprising a three-methylene spacer between the silicon atom and the oxygen atom in the presence of 1M LiPF$_6$ salt. Data with dotted lines show the thermal stability for OS electrolytes without the three-methylene spacer between the silicon atom and the oxygen atom in the presence of 1M LiPF$_6$ salt. % Decomposition is determined by $^1$H NMR analysis of the liquid phase remaining after heating the sample successively at each temperature.

As shown in FIG. 21: OS's containing a three-methylene spacer have greatly enhanced thermal stability with LiPF$_6$. Compare the traces in FIG. 21 for 1NM2, 1NM3, and 1ND2 (all of which were ~100% degraded at <125° C., versus DE1S3M2, TE1S3M2, 1S3M3, and, 1S1S2, which showed minimal degradation out to 150° C. In short, the non-spacer compounds with a Si—O bond form significant gas products and react to completion quickly once reaction initiation temperature is reached (dashed lines in FIG. 21.) In contrast, the spacer compounds resist decomposition with LiPF$_6$ and do not form significant gas phase products up to 150° C. (solid lines in FIG. 21)

Figure 22:
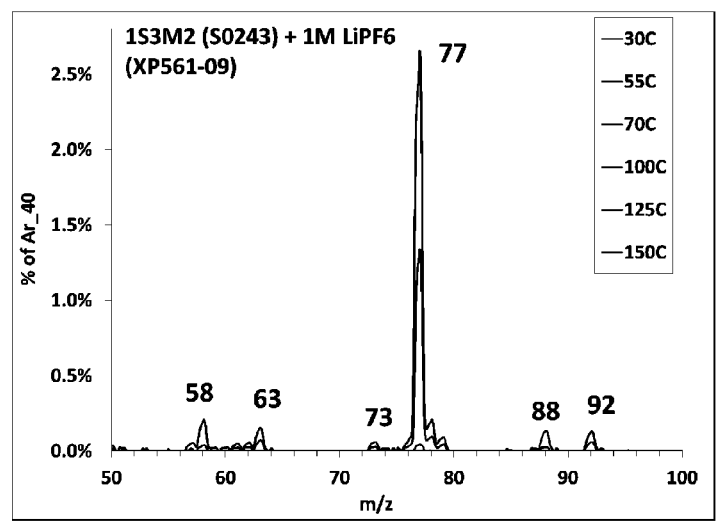
FIG. 22 is a mass spectrograph depicting the vapor phase thermal decomposition products of 1S3M2+1M LiPF$_6$. Gas phase decomposition products are first observed at 100° C.

FIG. 22 presents the thermal stability of 1S3M2+1M LiPF$_6$. This compound reacts with LiPF$_6$ at 100° C. with a significant increase in reaction as the temperature rises. The gas phase decomposition products are similar to those seen in the decomposition of 1NM2, principally Me$_3$SiF (92 m/z) and 1,4-dioxane (88 m/z). $^1$H NMR analysis (data not shown) indicated that 1S3M2 is ≈2% decomposed based on the MeSi peak in the $^1$H NMR spectrum. This figure quite clearly shows that the three methylene spacer increases the thermal stability of the electrolyte in the presence of LiPF$_6$.

Figure 23:
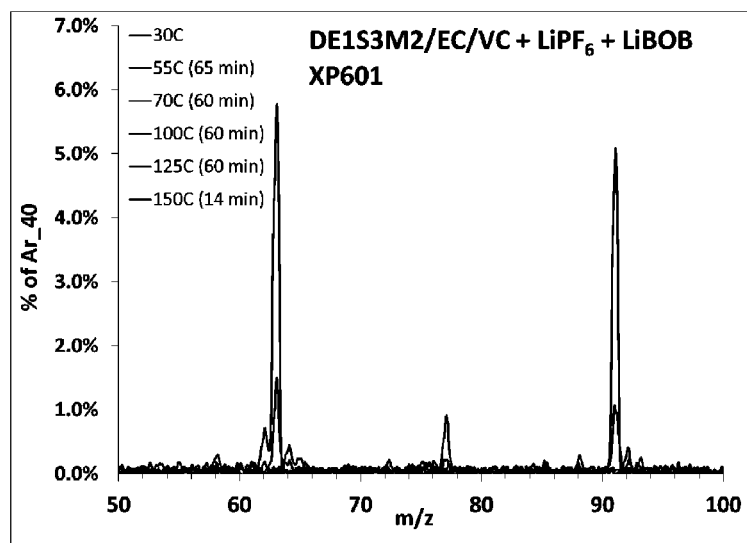
FIG. 23 is a mass spectrograph depicting the vapor phase thermal decomposition products of DE1S3M2/EC/VC+1M LiPF$_6$ and 1M LiBOB. Gas phase decomposition products are first observed at 125° C.

FIG. 23 depicts the thermal stability of DE1S3M2+1M LiPF$_6$. DE1S3M2 begins to decompose at about 125° C. The gas phase products include 1,4-dioxane and Et$_2$MeSiF (120 m/z). $^1$H NMR analysis showed that this compound showed 5% decomposition in the MeSi region after heating to 150° C.

Figure 24:
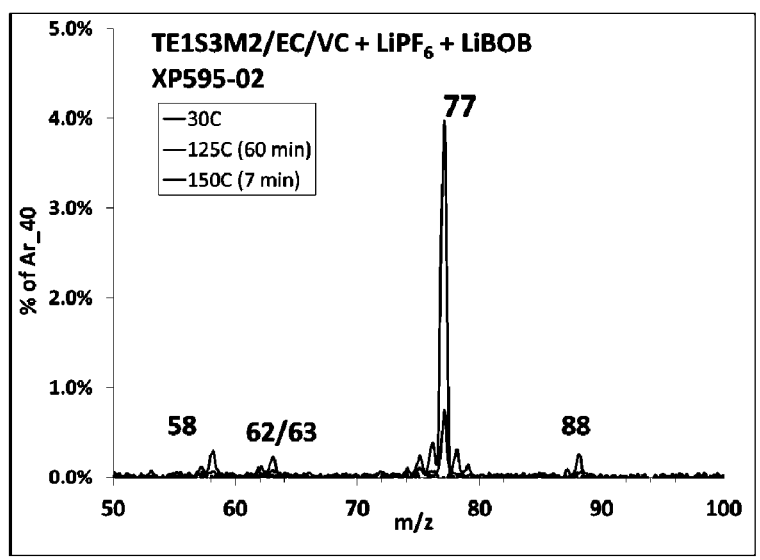
FIG. 24 is a mass spectrograph depicting the vapor phase thermal decomposition products of TE1S3M2/EC/VC+1M LiPF$_6$ and 1M LiBOB. Gas phase decomposition products are first observed at 125° C.

FIG. 24 depicts the thermal stability of TE1S3M2+1M LiPF$_6$. TE1S3M2 decomposes at about 125° C. The decomposition products include 1,4-dioxane (88 m/z) and Et$_3$SiF (134 m/z). $^1$H NMR shows approximately 7-8% decomposition in the MeSi region after heating to 150° C.

Figure 25:
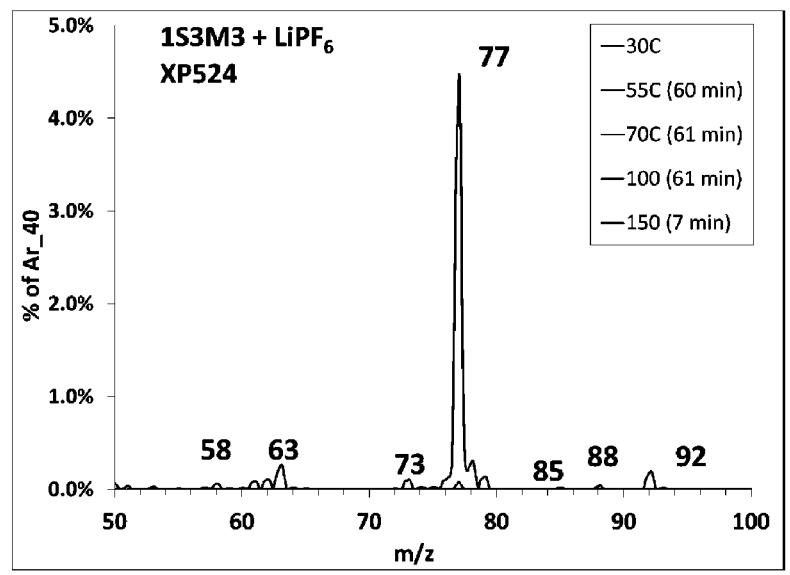
FIG. 25 is a mass spectrograph depicting the vapor phase thermal decomposition products of 1S3M3+1M LiPF$_6$. Gas phase decomposition products are first observed at 100° C.

FIG. 25 depicts the thermal stability of 1S3M3+1M LiPF$_6$. In the same fashion as 1S3M2, 1S3M3 reacts with LiPF$_6$ at about 100° C. and the reaction increases as the temperature increases. The gas phase decomposition products are similar to those seen for 1NM3 (Me$_3$SiF (92 m/z) and 1,4-dioxane (88 m/z)). No evidence was seen for 1NM3 impurities being present; therefore the decomposition products are attributed to 1S3M3. $^1$H NMR analysis (data not shown) showed that 1S3M3 is ≈3% decomposed based on the MeSi peak. These data support the finding that including a three methylene spacer unit between the Si atom and the O atom increases thermal stability with LiPF$_6$.

Figure 26:
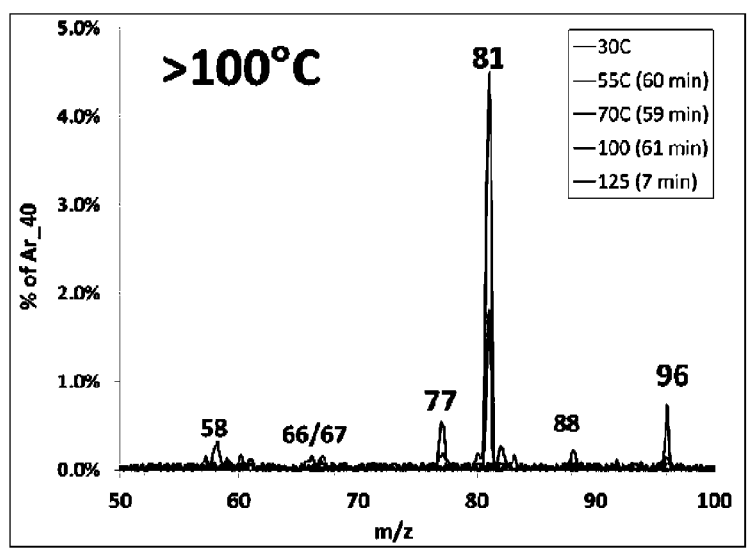
FIG. 26 is a mass spectrograph depicting the vapor phase thermal decomposition products of 1N1S2+1M LiPF$_6$. Gas phase decomposition products are first observed at 100° C.

FIG. 26 depicts the thermal stability of 1N1S2 in the presence of 1M LiPF$_6$. This compounds starts to decompose at about 70° C. At this temperature, several peaks appear at <50 m/z. Their exact assignment is unknown, but has been attributed to decomposition of the nonspacer substituent containing a single glycol unit. Above 100° C., the degradation products include Me$_2$SiF$_2$ (96 m/z) and 1,4-dioxane (88 m/z). These data strongly suggest that the decomposition takes place in two steps: 1N1S2→F1S$_3$M2→Me$_2$SiF$_2$. $^1$H NMR analysis of the MeSi peak showed that 1N1S2 has completely reacted to F1S$_3$M2 and Me$_2$SiF$_2$ after heating to 125° C.

Figure 27:
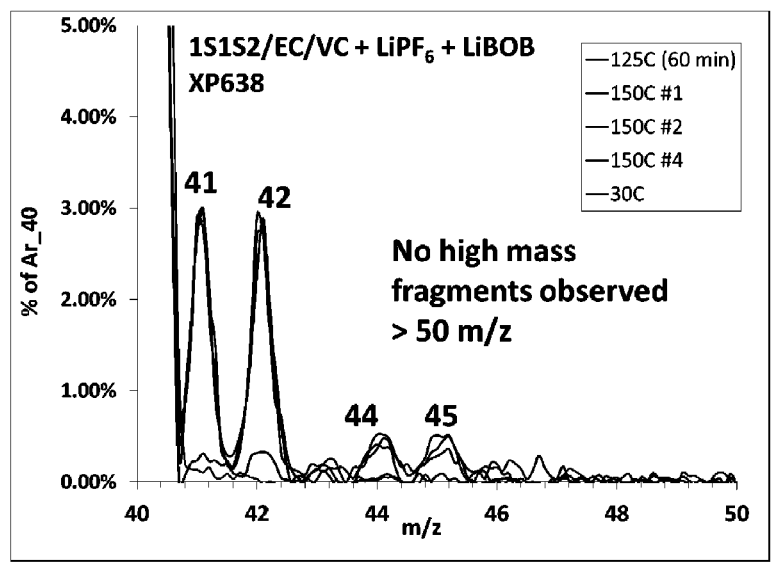
FIG. 27 is a mass spectrograph depicting the vapor phase thermal decomposition products of 1S1S2/EC/VC+1M LiPF$_6$ and 1M LiBOB at 150° C. No gas phase decomposition products are observed up to 150° C.

FIG. 27 depicts the thermal stability of 1S1S2+1M LiPF$_6$. 1S1S2 reacts at 150° C., but the reaction is not as vigorous as, or complete as the reaction of 1ND2. The MS spectrum showed that no high mass fragments (>50 m/z) were observed in gas phase, indicating that silicon is not released in the decomposition reaction. At 150° C., only lower mass fragments were observed, as shown in FIG. 27. $^1$H NMR analysis (data not shown) revealed 15% decomposition of 1S1S2 to liquid phase products. FIG. 27 indicates that disubstituted spacer compounds, as represented by 1S1S2, tend to be more thermally stable as compared to analogous disubstituted non-spacer compounds, such as 1ND2).

Figure 28:
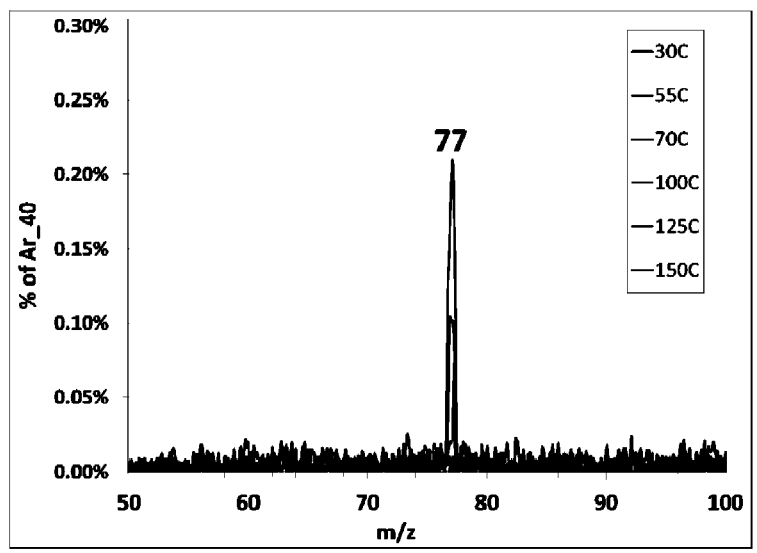
FIG. 28 is a mass spectrograph depicting the vapor phase thermal decomposition products of 1S3M2+1M LiBF$_4$. Gas phase decomposition products are first observed at 100° C.
Figure 29:
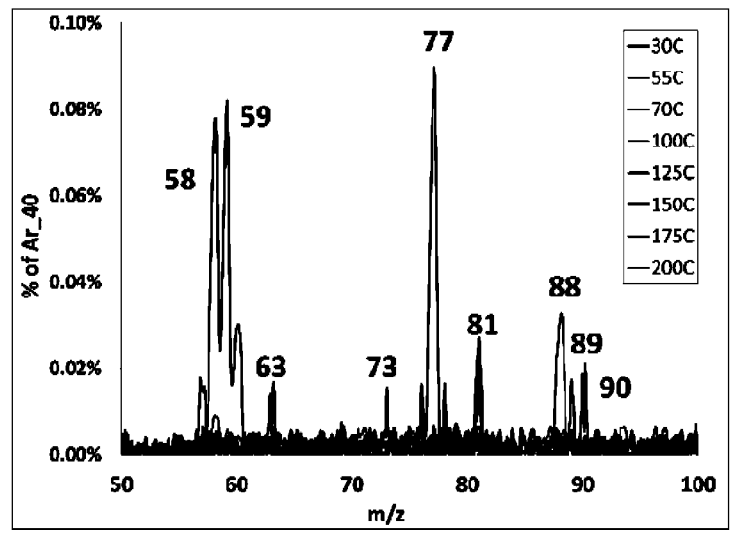
FIG. 29 is a mass spectrograph depicting the vapor phase thermal decomposition products of 1S1M2+1M LiBF$_4$ at 200° C. Gas phase decomposition products are first observed at 150° C.

FIGS. 28 and 29 present a summary of the thermal stabilities of spacer molecules in the presence of 1M LiBF$_4$. FIG. 28 shows the thermal stability of 1S3M2, while FIG. 29 depicts the thermal stability of 1S1S2. As shown in these two figures, spacer OS compounds tend to be more thermally stable with LiBF$_4$ as compared to LiPF$_6$. All spacer OS electrolytes are stable under long-term storage at room temperature, unlike the non-spacer OS electrolytes. Table 7 is a side-by-side comparison of the thermal stability of selected spacer molecules in the presence of LiPF$_6$ versus LiBF$_4$.

TABLE 7

Comparison of Thermal Stability of Spacer Molecules in 1M LiPF$_6$ versus LiBF$_4$

| | After Heating with LiPF$_6$ | | | After Heating with LiBF$_4$ | | |
|---|---|---|---|---|---|---|
| Solvent | T$_{decomp}$ (° C.) | T$_{final}$ (° C.) | % Decomp | T$_{decomp}$ (° C.) | T$_{final}$ (° C.) | % Decomp |
| 1S3M2 | 100 | 150 | 2% | 125 | 150 | <0.5% |
| 1S1S2 | 150 | 150 | 16% | 150 | 200 | 10% |

Electrochemical Stability of Spacer Molecules: The electrochemical stabilities of the spacer molecules were tested in the same fashion (and using the same apparatus) as for the non-spacer compounds described earlier. The results are summarized in Table 8.

TABLE 8

Summary of Electrochemical Stability of Spacer Molecules

| Solvent | Potential at 1 mA/cm$^2$ |
|---|---|
| 1S1M3 | 4.4 V |
| 1ND1 | 5.1 V |
| 1NT1 | 5.2 V |
| 1NQ1 | 6.3 V |
| 1NM2 | 5.2 V |
| 1ND2 | 5.3 V |
| 1ND2E | 5.2 V |
| 1NT2 | 5.3 V |
| 1NQ2 | 5.3 V |
| 1NM3 | 5.1 V |
| 1ND3 | 5.4 V |
| 1N1S2 | 5.2 V |
| EC:DEC | 6.5 V |
| 1S1S2 | 7.3 V |
| 1S3M2 | 7.8 V |
| DE1S3M2 | 5.3 V |
| 1S3M3 | 7.9 V |

Several trends can be gleaned from Table 8. Most notable is that dramatic improvements in oxidative stability are achieved by including a three-methylene spacer between the Si and O atoms (+2 to 2.5 V vs. Li/Li$^+$). However, incorporating only a one-methylene spacer results in reduced stability (1S1M3=4.4V, 1S3M3=7.8V). In general, both "spacer" and "non-spacer" OS molecules have similar oxidative stability behavior regardless of the length of the glycol chain. Disubstituted spacer OS molecules have reduced oxidative stability compared to mono-substituted OS molecules, for example compare 1S3M2, 1S3M3 vs. 1S1S2. Disubstituted OS molecules with at a spacer chain and a non-spacer chain have an oxidative stability dominated by the less stable non-spacer group with the Si—O bond.

Figure 30:
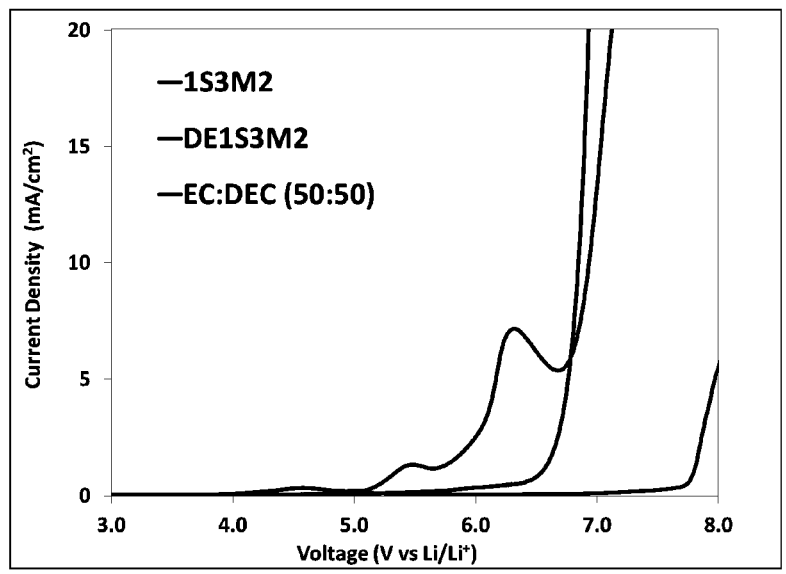
FIG. 30 together with FIG. 31 depicts oxidative stability of 1S3M2 and DE1S3M2 with 1M LiPF$_6$.
Figure 31:
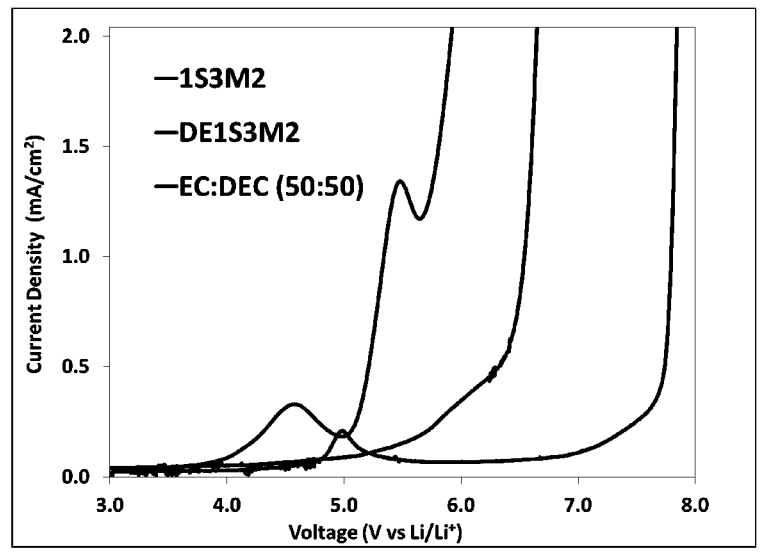
FIG. 31 together with FIG. 30 depicts oxidative stability of 1S3M2 and DE1S3M2 with 1M LiPF$_6$. Data were gathered using the three-electrode linear sweep described for FIG. 18B.

FIG. 30 and FIG. 31 show the oxidative Stability with LiPF$_6$ of 1S3M2 and DE1S3M2, respectively. Comparing these two figures shows that adding bulky groups on the Si atom of OS molecules containing the 3-methylene spacer between the Si and O atoms (as in DE1S3M2) results in significantly lower oxidative stability.

Figure 32:
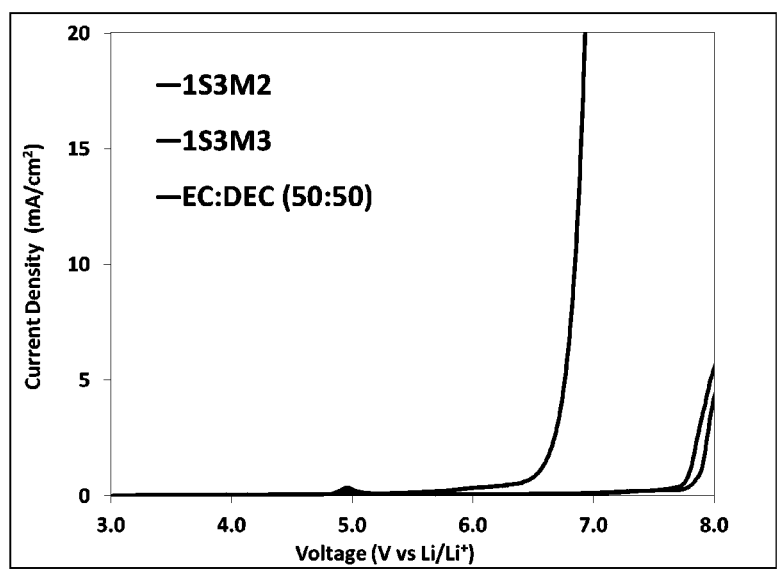
FIG. 32 together with FIG. 33 depicts oxidative stability of 1S3M2 and 1S3M3 with 1M LiPF$_6$.
Figure 33:
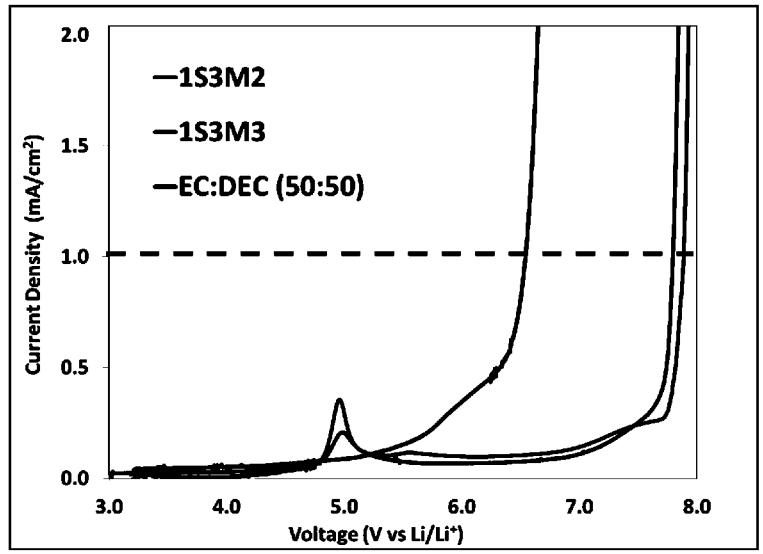
FIG. 33 together with FIG. 32 depicts oxidative stability of 1S3M2 and 1S3M3 with 1M LiPF$_6$. Data were gathered using the three-electrode linear sweep described for FIG. 18B.

FIG. 32 and FIG. 33 show the oxidative stability with LiPF$_6$ of 1S3M2 and 1S3M3. Both 1S3M2 and 1S3M3 show higher oxidative stability than an EC:DEC electrolyte standard with LiPF$_6$. Increasing the length of the glycol chain does not significantly increase oxidative stability.

Figure 34:
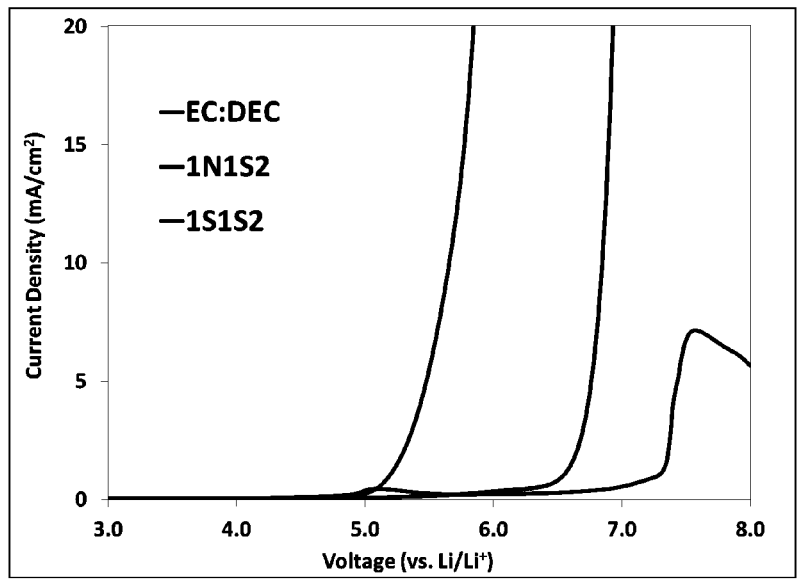
FIG. 34 together with FIG. 35 depicts oxidative stability of 1N1S2 and 1S1S2 with 1M LiPF$_6$.
Figure 35:
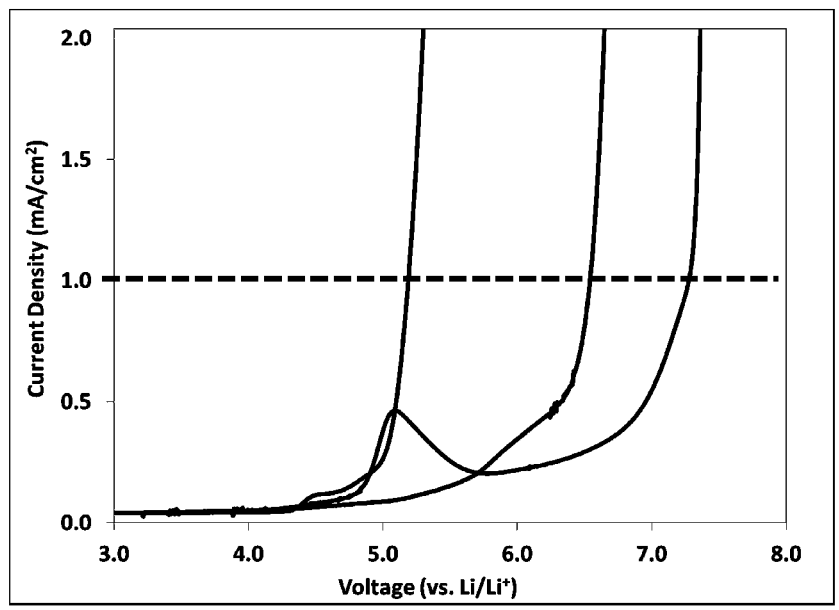
FIG. 35 together with FIG. 34 depicts oxidative stability of 1N1S2 and 1S1S2 with 1M LiPF$_6$. Data were gathered using the three-electrode linear sweep described for FIG. 18B.

FIG. 34 and FIG. 35 show the oxidative stability with LiPF$_6$ of 1N1S2 vs. 1S1S2. Here, the oxidative stability of the disubstituted OS is determined by presence or absence of a Si—O bond. The non-spacer-containing OS (1N1S2) is less stable than the EC:DEC electrolyte control. In contrast, the disubstituted spacer-containing OS (1S1S2) is more stable than the EC:DEC control.

Figure 36:
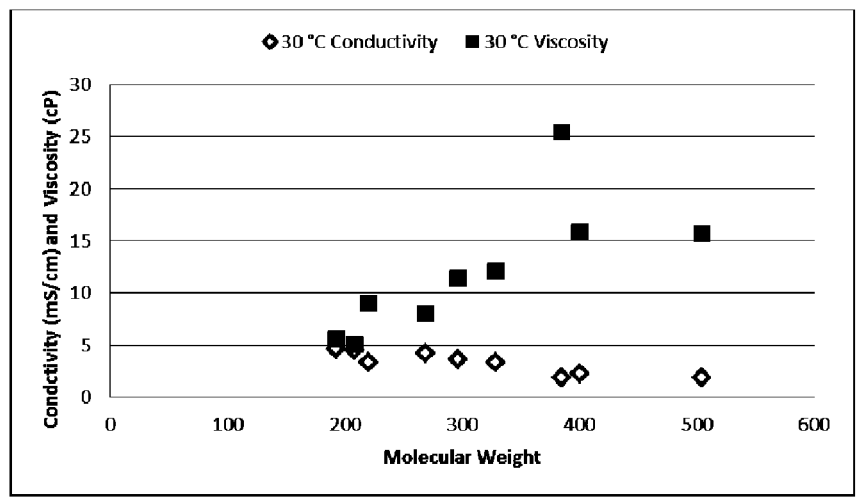
FIG. 36 is a histogram depicting the physical properties of the 1Nxx Series of compounds versus molecular weight.

FIG. 36 presents the conductivity and viscosity of selected 1Nxx Series compounds at 30° C. All of the electrolytes were formulated with 20% EC and 1M LiPF$_6$. As shown in FIG. 36, increasing molecular weight correlates to increased viscosity and decreased conductivity. Thus, molecular weight can be seen as a rough indicator of expected performance of the electrolyte within an electrochemical cell.

Figure 37:
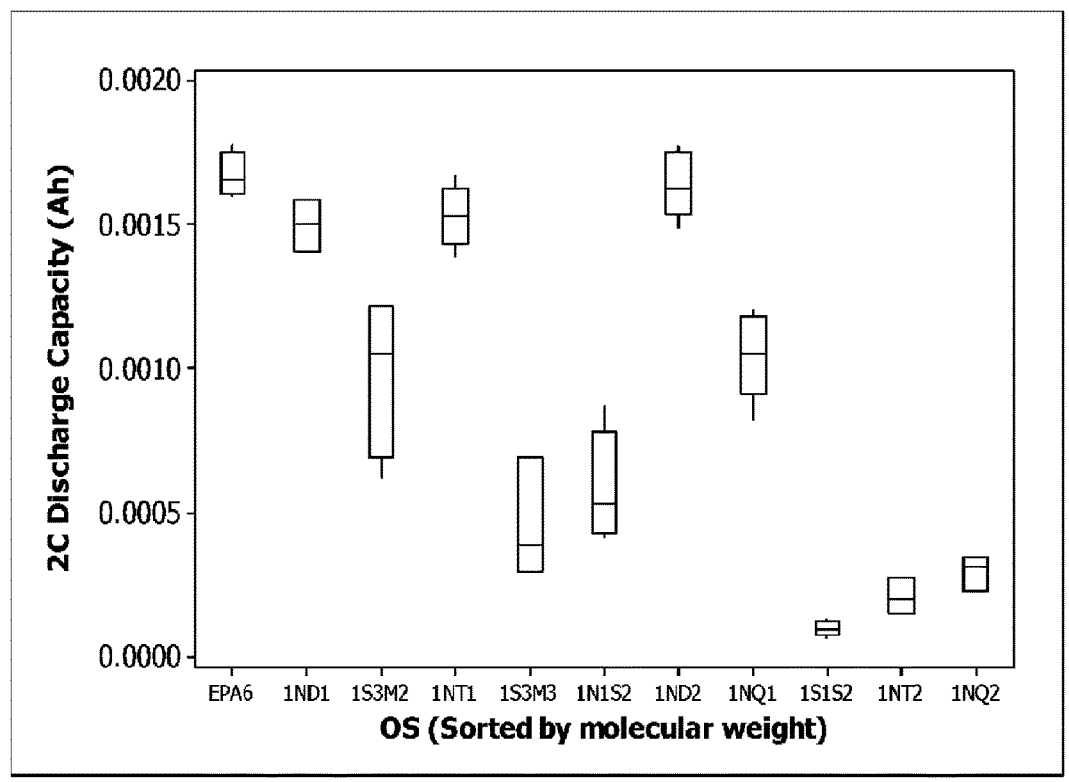
FIG. 37 is a histogram depicting 2C discharge capacity for various organosilicon electrolytes described herein, sorted by molecular weight.
Figure 38:
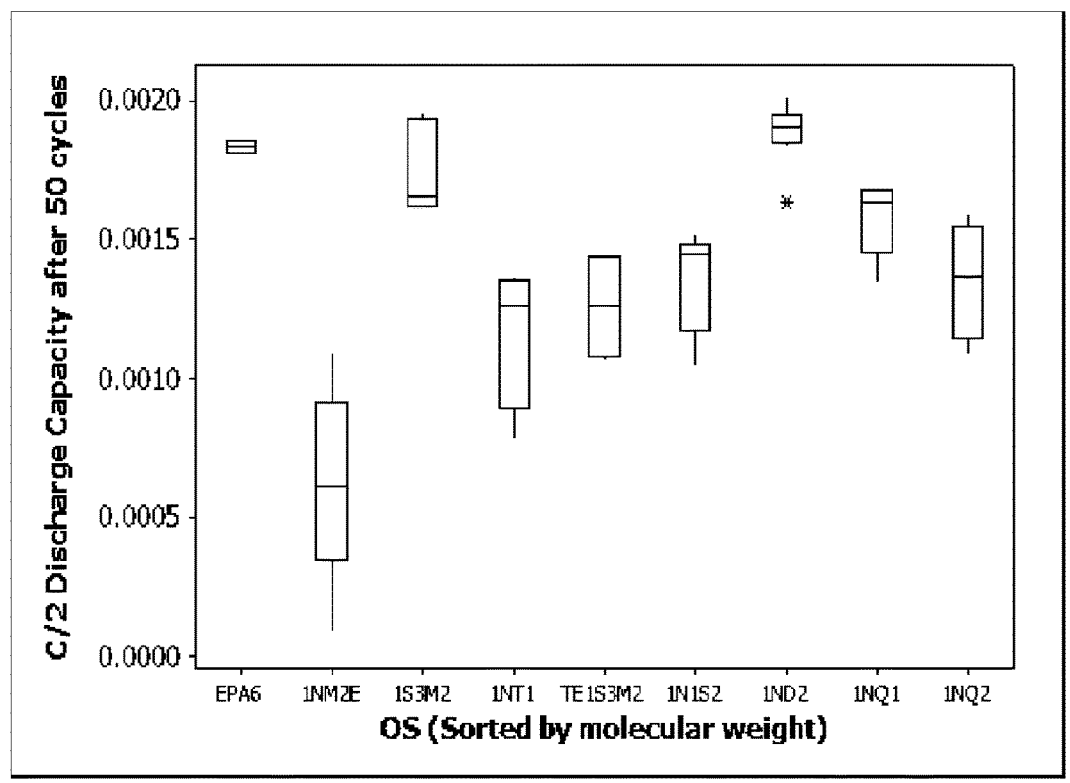
FIG. 38 is a histogram depicting discharge capacity after 50 C/2 cycles for various organosilicon electrolytes described herein, sorted by molecular weight.

FIG. 37 is a histogram showing the 2C discharge capacities for selected OS's, sorted by molecular weight. FIG. 38 is a histogram showing discharge capacity after 50 C/2 cycles for selected OS's, again sorted by molecular weight. All of the electrolytes were formulated with 20% EC and 1M LiPF$_6$.

EXAMPLES

The following Examples are included to provide a more complete description of the electrolytes and devices described and claimed herein. The Examples are not intended to limit the scope of the claims in any fashion.

Cathode Details:

The cathode used in the examples comprised a Lithium Nickel-Manganese-Cobalt (NMC) oxide layered material compounded with conductive carbon additive and polyvinylidene fluoride polymer binder on an aluminum backing (designated herein as a NMC cathode). Any suitable cathode, however, may be used in the device, including (by way of example and not limitation), cathodes comprising $LiCoO_2$, $LiMn_2O_4$, $LiNiO_2$, $LiFePO_4$, $Li_2FePO_4F$, $LiCo_{1/3}Ni_{1/3}Mn_{1/3}O_2$, $Li(Li_aNi_xMn_yCo_z)O_2$, and the like. The rated discharge capacity of the cathode was approximately 4.0 mAh/cm². The cathode material was fabricated as a single-sided coated sheet on Aluminum current collector. Individual electrodes (15.85 mm in diameter) were punched from the bulk sheet material.

Anode Details:

The anodes used in the examples comprised graphite or lithium-containing anodes. Any suitable anode material will do, however, and examples include the commercial graphite-based anodes or experimental anodes based on Si materials or Sn materials, etc.

Electrolyte Preparation:

Electrolyte solutions were prepared by dissolution of lithium salts into liquid solvent inside an argon glove box. Lithium salts and liquid solvents were properly dried to minimize water content before blending. The Lithium salts included commercially available materials such as LiTFSI (lithium bis(trifluoromethane) sulfonimide, provided by 3M), $LiPF_6$ (lithium hexafluorophosphate, provided by Novolyte, Independence, Ohio, USA), LiBOB (lithium bis (oxalato)-borate, provided by Novolyte) and $LiBF_4$ (lithium tetrafluoroborate, provided by Novolyte); and combinations thereof. Co-solvents such as EC (ethylene carbonate) and VC (vinylene carbonate) may also be added to solution for some variations. Chemical structures for the compounds used to make the electrolytes described in the examples are as follows:

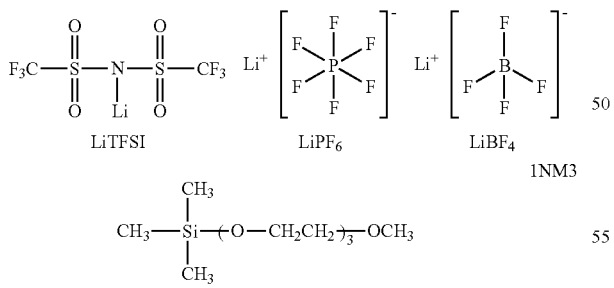

LiTFSI     $LiPF_6$     $LiBF_4$

1NM3

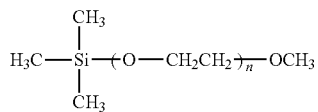

1ND2

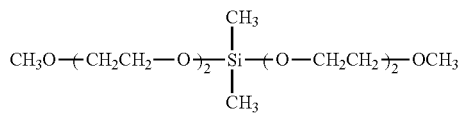

1ND3

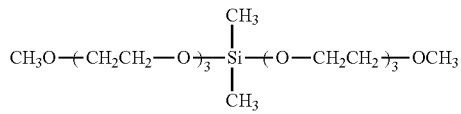

1S1M3

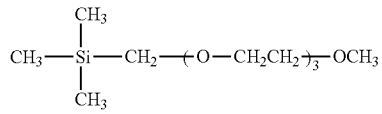

1S3M3

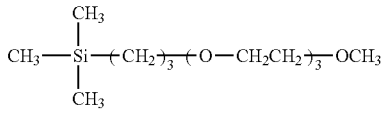

More generically, the 1NMn compounds have the general formula:

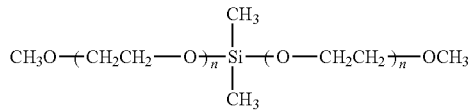

wherein "n" is an integer from 1 to 15.

The 1NDn compounds have the general formula:

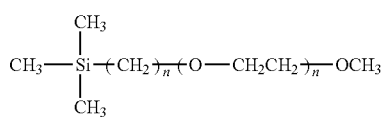

wherein the two "n" subscripts are independently selected from integers ranging from 1 to 15. In the preferred versions, both "n" substituents are the same value, yielding a bilaterally symmetrical molecule.

1SnMn compounds have the general formula:

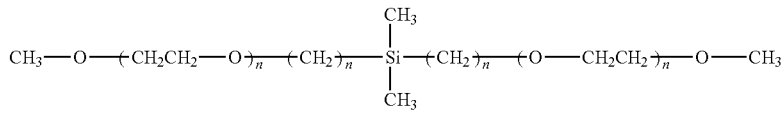

wherein the two "n" subscripts are independently selected from integers ranging from 1 to 15.

1SnSn, where n refers to the numbers of glycol units in each chain, have the general formula:

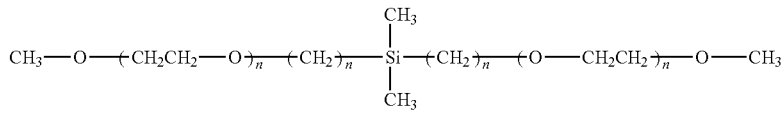

wherein each "n" substituent is independently selected from 1 to 15. Here the glycol arms are symmetrical in that they each have a carbon atom bound to the single silicon atom.

Additionally, disclosed herein are OS compounds designated 1NnSn, where n refers to the numbers of glycol units in each chain. Here, the compounds are asymmetrical and have at least one oxygen atom bound to the single silicon atom:

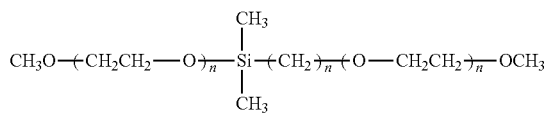

wherein each "n" substituent is independently selected from 1 to 15.

Synthesis:

1NM2:

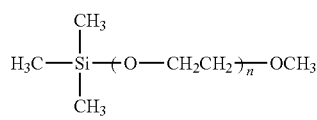

Diethylene glycol methyl ether (255.8 g, 2.13 mol) and hexamethyldisilazane (185.5 g, 1.16 mol) were added to a 1 L flask, then Al(H$_2$PO$_4$)$_3$ (10 g, 30 mmol, 1.4% mol equivalents) was added to the mixture and heated to 120° C. during 90 minutes. Vigorous gas production was observed. The product was distilled under reduced pressure (0.5 Torr, 50° C.), then dried with sodium metal at 110° C. overnight and distilled again.

1NM3:

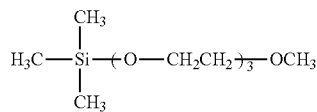

This was purchased either from Sigma Aldrich Fine Chemicals (St. Louis, Mo.) or from Silar Laboratories (Wilmington, N.C.). It can also be fabricated based on the synthesis reported in U.S. Patent Pub. No.: US 2012/0135313, which is incorporated herein. It was dried with sodium and distilled before use.

1ND1:

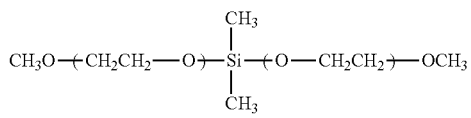

2-Methoxyethanol (457 g, 6 mol) and hexamethylcyclotrisilazane (219.5 g, 1 mol) were added to a 1 L flask, then Al(H$_2$PO$_4$)$_3$ (10 g, 30 mmol) was added to the mixture and heated to 120° C. overnight, vigorous gas production was observed. The product was distilled under reduced pressure (0.5 Torr, 54° C.), then dried with sodium metal at 110° C. overnight and distilled again.

1ND2:

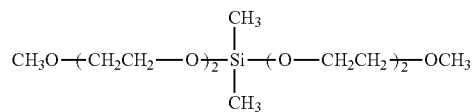

Diethyleneglycol methyl ether (735 g, 6.11 mol) and hexamethylcyclotrisilazane (226 g, 1.03 mol), were mixed in a 2 L flask at r.t. and aluminum phosphate monobasic (12.5 g, 37 mmol) was added under vigorous stirring. The mixture was slowly heated and kept at 120° C. for 1 h and then heated to 140° C. overnight. The crude product was purified by fractional distillation under reduced pressure (135° C. at 0.4 Torr). It was then dried overnight with sodium at 110° C. and distilled again.

1ND3:

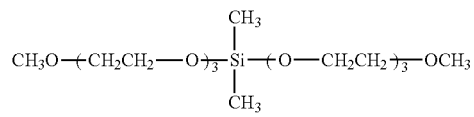

Triethyleneglycol methyl ether (300 g, 1.83 mol) and dimethylcyclosilazanes in hexane (205 g, 20% in hexane, 0.91 mol), were mixed in a 1 L flask, the hexane was evaporated and the mixture heated and kept at about 120° C. overnight. The crude product was purified by fractional distillation under reduced pressure. It was then dried overnight with sodium at 110° C. and distilled again.

1NT1:

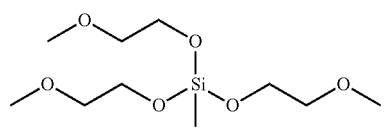

Trimethoxymethylsilane (204 g, 1.5 mol) and 2-methoxyethanol (458 g, 6 mol) were mixed in a 500 mL flask and NaOH was added as a catalyst (0.5 g), the mixture was heated to 90° C. overnight to slowly distill the methanol obtained as byproduct, then it was heated 125° C. to distill unreacted methoxyethanol. The compound was distilled under vacuum for purification (91° C., 0.6 Torr), dried with sodium and distilled again.

1NT2:

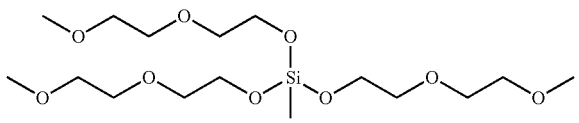

Was obtained as byproduct during the drying of 1ND2 and purified by fractional distillation (191° C., 0.8 Torr).

1NQ1:

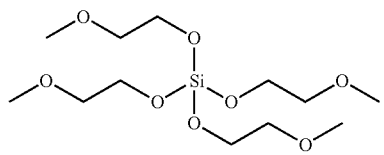

2-Methoxyethanol (183 g, 2.4 mol) and tetraethoxysilane (125 g, 0.6 mol) were added to a 500 mL flask and NaOH was added as a catalyst (0.5 g), the mixture was heated to 110° C. overnight to slowly distill the ethanol obtained as byproduct. The product was purified by distillation (130° C., 0.5 Torr), dried with sodium and distilled again.

1NQ2:

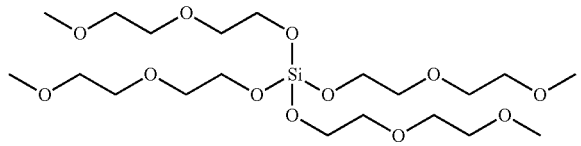

Diethyleneglycol methyl ether (286 g, 2.4 mol) and tetraethoxysilane (125 g, 0.6 mol) were added to a 500 mL flask and NaOH was added as a catalyst (0.5 g), the mixture was heated to 130° C. overnight to slowly distill the ethanol obtained as byproduct. The product was purified by distillation (240° C., 0.6 Torr), dried with sodium and distilled again.

1S1M3:

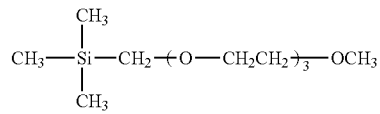

Triethylene glycol methyl ether (985 g, 6 mol) was added to a 2 L flask and sodium was slowly added to it in small portions (34.5 g, 1.5 mol), each portion was allowed to dissolve completely before adding the next one. Then potassium iodide was added (12.5 g, 0.075 mol), after it dissolved the mixture was heated to 110° C. and chloromethyltrimethylsilane (184 g, 1.5 mol) was added and left reacting overnight with strong stirring. The next day ammonium hydrogendifluoride (21 g) was added, the product extracted with hexane, the hexane was evaporated and the product purified by distillation (82° C., 0.4 Torr), and then dried with sodium and distilled again.

1S3M2:

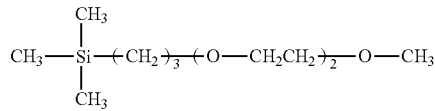

Diethyleneglycol methyl ether (396 g, 3.3 mol) was added to a 1 L flask and sodium was slowly added to it in small portions (15.2 g, 0.66 mol), each portion was allowed to dissolve completely before adding the next one. Then potassium iodide was added (16.4 g, 0.1 mol), after it was dissolved the mixture was heated to 70° C. and chloropropyltrimethylsilane (100 g, 0.66 mol) was added and left reacting one day with strong stirring. The product was extracted with hexane, the hexane was evaporated and the product purified by distillation (88° C., 0.4 Torr), and then dried with sodium and distilled again.

1S3M3:

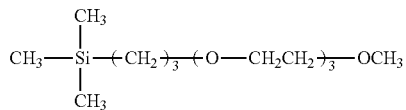

Triethyleneglycol methyl ether (250 g, 1.52 mol) was added to a 1 L flask and sodium was slowly added to it in small portions (7.65 g, 0.33 mol), each portion was allowed to dissolve completely before adding the next one. Then potassium iodide was added (8 g, 0.03 mol), after it was dissolved the mixture was heated to 90° C. and chloropropyltrimethylsilane (50 g, 0.33 mol) was added and left reacting overnight with strong stirring. The product was extracted with hexane, the hexane was evaporated and the product purified by distillation (111° C., 0.4 Torr), and then dried with sodium and distilled again.

1N1S2:

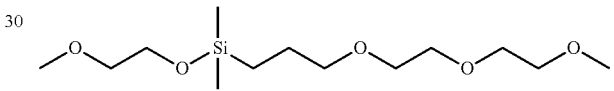

2-Methoxyethanol (182 g, 2.39 mol) and tetramethyldisilazane (160 g, 1.2 mol) were mixed in a 500 mL flask, then Al(H$_2$PO$_4$)$_3$ (1.5 g) was added and gas production was observed. After 2 hours diethyleneglycol allyl methyl ether (383 g, 2.39 mol) and platinum(0)-1,3-divinyl-1,1,3,3-tetramethyldisiloxane (5 drops, 2% in xylene) were added to the mixture and kept at 75° C. for 3 days. The product was purified by distillation (145° C., 0.4 Torr), dried with sodium and distilled again.

1S1S2:

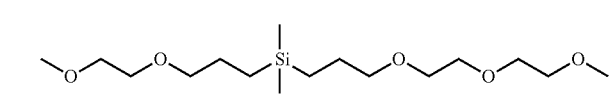

2-Methoxyethanol (289.5 g, 3.81 mol) was added to a suspension of sodium hydroxide (152 g, 3.8 mol) in toluene (600 mL) under strong stirring, then allyl bromide (461 g, 3.81 mol) was added dropwise to the mixture, the solvent was evaporated and the ethyleneglycol allyl methyl ether purified by distillation. This ethyleneglycol allyl methyl ether (140 g, 1.21 mol) was mixed with dimethylchlorosilane (115 g, 1.21 mol) and platinum(0)-1,3-divinyl-1,1,3,3-tetramethyldisiloxane (5 drops, 2% in xylene) was added to the mixture and kept at 75° C. overnight. The next day the mixture was dissolved in 300 mL of THF and lithium aluminum hydride (11.4 g, 0.3 mol) was added. The mixture was stirred for 4 hours and it was quenched with excess water, the solvents were evaporated and the silylated intermediate was purified by distillation. This silylated intermediate (63 g, 0.36 mol) was mixed with diethyleneglycol allyl methyl ether (57.2 g, 0.36 mol) then platinum(0)-1,3-divinyl-1,1,3,3-tetramethyldisiloxane (5 drops, 2% in xylene) was added to the mixture and kept at 80° C. overnight. The product was purified by distillation (163° C., 0.5 Torr), dried with sodium and distilled again.

1NM2E:

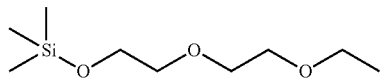

Diethylene glycol ethyl ether (300 g, 2.24 mol) and hexamethyldisilazane (180 g, 1.12 mol) were added to a 1 L flask, then Al(H$_2$PO$_4$)$_3$ (10 g, 30 mmol, 1.3% mol equivalents) was added to the mixture and heated to 120° C. during 90 minutes, vigorous gas production was observed. The product was distilled under reduced pressure (63° C., 0.6 Torr), then dried with sodium metal at 110° C. overnight and distilled again.

1ND2E:

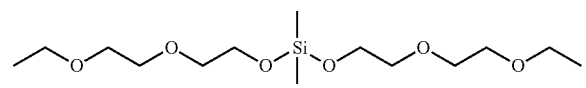 [SMILES: CCOCCOCCO[Si](C)(C)OCCOCCOCC]

Diethyleneglycol ethyl ether (500 g, 3.73 mol) and hexamethylcyclotrisilazane (135 g, 0.62 mol), were mixed in a 1 L flask at r.t. and aluminum phosphate monobasic (10 g, 30 mmol) was added under vigorous stirring. The mixture was slowly heated and kept at 120° C. for 1 h and then heated to 140° C. overnight. The crude product was purified by fractional distillation under reduced pressure (148° C. at 0.4 Torr). It was then dried overnight with sodium at 110° C. and distilled again.

DE1S3M2:

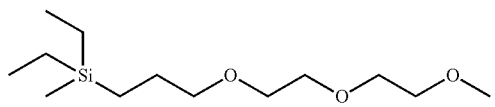 [SMILES: CC[Si](C)(CC)CCCOCCOCCOC]

Diethyleneglycol allyl methyl ether (187 g, 1.17 mol) and diethylmethylsilane (100 g, 0.98 mol) were mixed in a 500 mL flask and then platinum(0)-1,3-divinyl-1,1,3,3-tetramethyldisiloxane (5 drops, 2% in xylene) was added to mixture and kept at 65° C. overnight. The product was distilled under reduced pressure (122° C., 0.3 Torr), then dried with sodium metal at 110° C. overnight and distilled again.

TE1S3M2

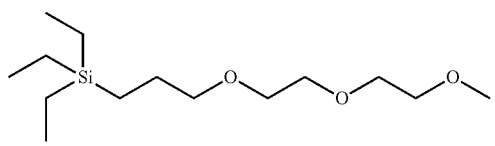 [SMILES: CC[Si](CC)(CC)CCCOCCOCCOC]

Diethyleneglycol allyl methyl ether (192 g, 1.2 mol) and triethylsilane (140 g, 1.2 mol) were mixed in a 500 mL flask and then platinum(0)-1,3-divinyl-1,1,3,3-tetramethyldisiloxane (5 drops, 2% in xylene) was added to mixture and kept at 120° C. overnight. The product was distilled under reduced pressure (128° C., 0.4 Torr), then dried with sodium metal at 110° C. overnight and distilled again.

Device Assembly:

The device tested comprises a 2032 stainless steel coin cell. Stainless steel current collectors (1.5 cm diameter) were used to press the electrodes together. The separator material was microporous polypropylene (Celgard® 2400 or 2500, Celgard, LLC). The batteries tested were assembled in an argon-purged glove box (water content below 5 ppm). All testing took place at 30° C. or 70° C.

Battery Testing:

The battery was formed for either 1 or 4 cycles by charging to 4.2V at 0.8 mA and discharging to 3.0V at 0.4 mA. After the first cycle, testing limits were adjusted to 4.3V. Devices were cycled at various charge rates: C/10 (0.8 mA), C/5 (1.6 mA), and C/20 (0.4 mA) for 10 cycles each. Testing was completed on a 4-channel Arbin battery tester (MSTAT4) or a Maccor 4600 battery tester.

Figure 2:
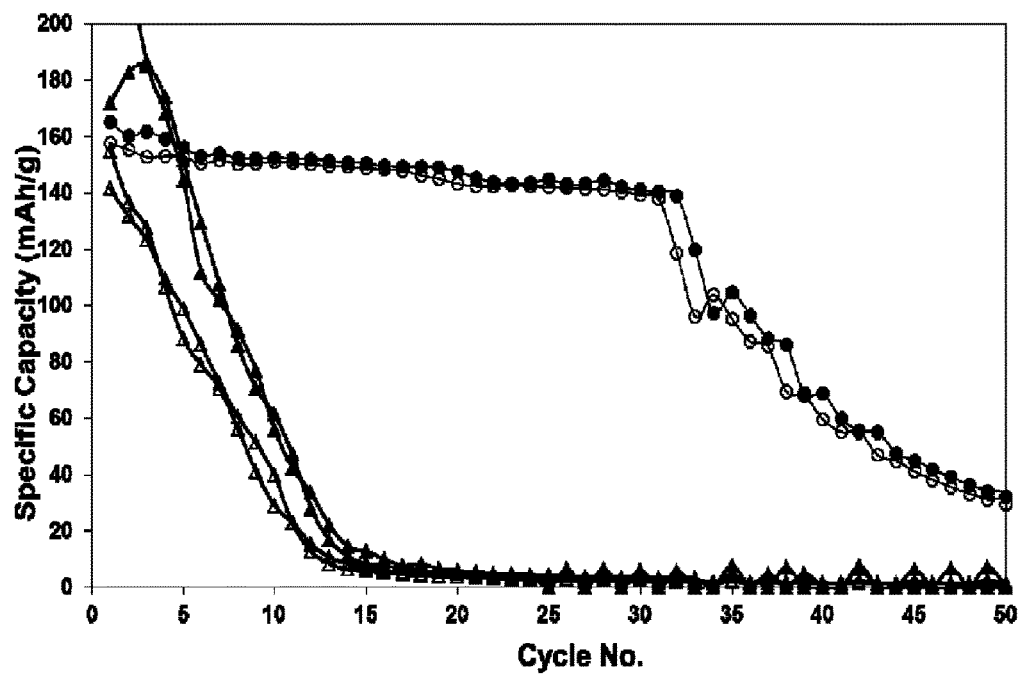
FIG. 2 is a cycling performance graph as described for FIG. 1; all conditions were the same as in FIG. 1 except a lithium anode was used and the testing was conducted at 70° C. This graph displays both charge (filled) and discharge (open) data.

Referring now to the figures, FIG. 1 is a cycling performance graph of the 1st generation OS compound 1NM3 in an electrolyte composition including the salts LiPF$_6$ or lithium bis(trifluoromethanesulfonyl)imide (LiTFSI) at 30° C. As is shown in the graph, the performance at this temperature is comparable between the commercial carbonate control and a 1NM3-containing electrolyte with either LiPF$_6$ or LiTFSI included as the salt. The charging protocol was constant current, constant voltage (CCCV) C/2 to 4.2 V. The discharge cycle was C/2 to 3.0V for 50 cycles. However, compare FIG. 1 to FIG. 2. FIG. 2 is a cycling performance graph as described for FIG. 1. In this experiment, a lithium anode was used (rather than graphite as in FIG. 1) and the cell was discharged at 70° C., rather than 30° C. Here, there is a very marked degradation of cycling performance of 1NM3-containing electrolytes as compared to the commercial carbonate control. At this elevated temperature, the OS electrolyte suffers essentially a complete break down after 15 cycles. LiTFSI was used as the salt in these experiments.

Figures 3A, 3B:
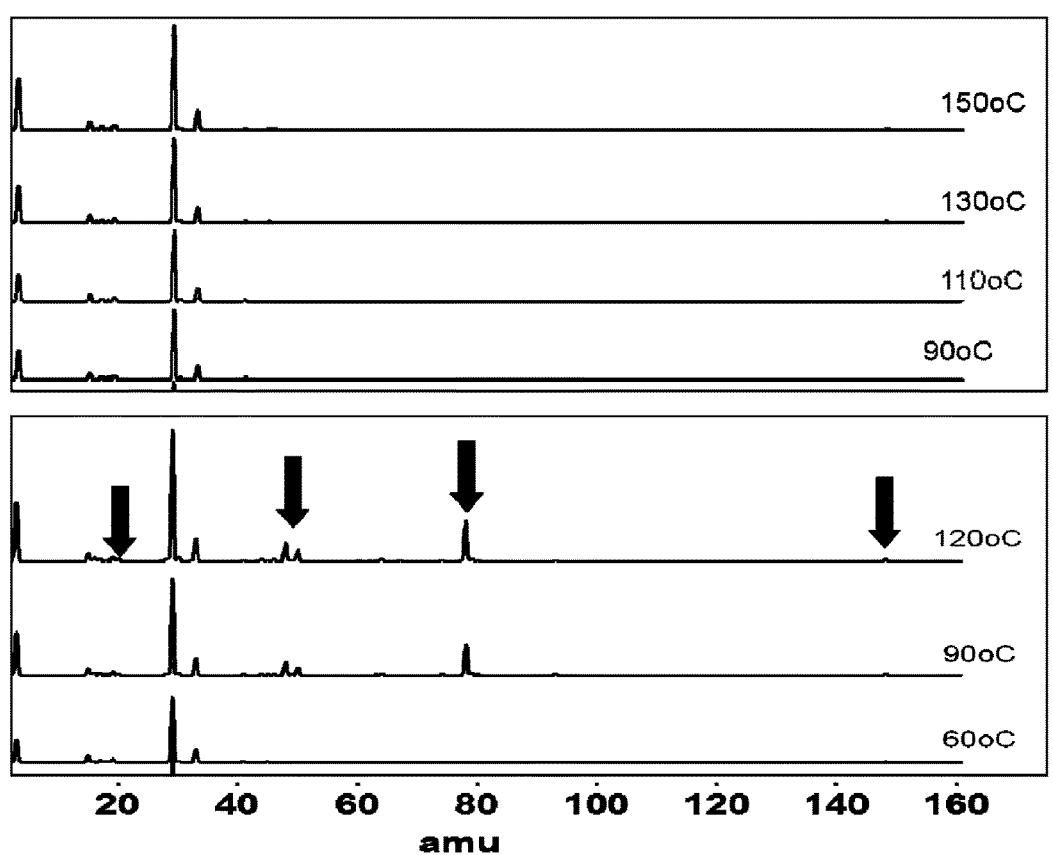
FIGS. 3A and 3B depicts salt-related thermal decomposition behaviors.

To explore the temperature stability issue further, potential salt-related thermal decomposition issue were investigated. Here, electrolytes were formulated using 1NM3 and LiTFSI (FIG. 3A) and 1NM3 and LiPF$_6$ (FIG. 3B). The mass spectrogram of the vapor phase of each electrolyte composition was taken at the stated temperatures. In going from 90° C. to 150° C., the mass spectrograms of the 1NM3/LiTFSI electrolyte composition remained unchanged. In contrast, in the mass spectra of the 1NM3/LiPF$_6$ electrolyte composition, new peaks (shown by arrows in the figure) start to appear at 90° C. These peaks indicate the onset of decomposition of the 1NM3/LiPF$_6$ electrolyte composition.

In the 1NMn compounds, the oxygen of the first PEO subunit is bonded directly to the silicon atom:

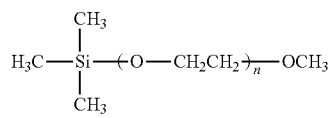

In contrast, in the 1SnMn compounds, there are methylene spacer units between the silicon atom and the PEO side chain:

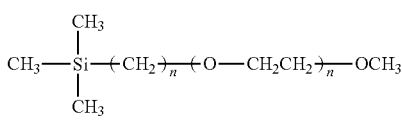

Thus, a series of experiments were undertaken to see what effect, if any, the length of the methylene spacer would have on the physical properties of electrolyte composition containing various 1NMn compounds as compared to the 1SnMn compounds. Thus, various electrolyte compositions containing 1NM3, 1S1M3 and 1S3M3 were formulated and tested for conductivity, viscosity, and flashpoint. The results are discussed above. The methylene spacer tends to lower conductivity, increase viscosity, and increase flash point. The results when using LiPF$_6$ as the salt, though, do not follow the trend. Using 1NM3/LiPF$_6$, the conductivity was quite significantly improved, but the flashpoint dropped to 20° C. The combination of 1S3M3/LiPF$_6$, the conductivity dropped as compared to 1NM3/LiPF$_6$, but the flashpoint improved to 129° C.

When the various OS's were tested for thermal stability neat (i.e., not in the presence of a lithium salt), the testing revealed that 1NM3, 1S1M3 and 1S3M3 are all thermally stable up to 150° C. However, when 1NM3 and 1S3M3 are formulated into an electrolyte composition with LiPF$_6$, the results are somewhat different. The 1NM3/LiPF$_6$ mass spectrum shows that new peaks appeared at approximately 70° C., specifically a trimethylfluorosilane peak appearing at m/z 92. (Trimethylfluorosilane has a boiling point of 17° C. and thus most of it would move into the vapor phase at 70° C.) Peaks appeared at m/z 63 and 73 which are sub-fragments of the main peak at m/z 92. For the 1S3M3/LiPF$_6$ composition, a salt-related reaction was observed at 100° C. The decomposition products, however, were identical to those for the 1NM3-containing electrolyte composition. The data indicate that at least when coupled with LiPF$_6$, the methylene spacer increases the thermal stability of the electrolyte composition (breakdown at about 70° C. for 1NM3 (no spacer) versus about 100° C. for 1S3M3 (propylene spacer)).

A comparison was run between the discharge rates of electrolyte compositions comprising 1NM2 vs. 1NM3 vs. 1S3M3 (the OS compound with the very high oxidation potential). Cycling was tested at a variety of rates (C/10 to 2C) and it was found that 1S3M3 performed essentially identically to all other test electrolytes at all rates with the marked exception of 2C.

Several additional symmetrical (1ND2) and unsymmetrical (1N1S2) OS compounds were also investigated. These compounds were synthesized in an attempt to overcome the various shortcomings noted above with respect to earlier OS compounds. Notably, compounds such as 1ND2 are bilaterally symmetrical, as contrasted with compounds such as 1NM3, which have the silicon atom at the 1-position of the molecule. The effect of repositioning the silicon atom to a central location on the molecule was investigated. See the discussion above. To summarize, when using LiPF$_6$ as the salt, the 1ND2 OS significantly increases flash point (very beneficial for safety), has a lower viscosity, and an essentially identical conductivity as compared to 1NM3-containing electrolytes. A high flashpoint temperature is desirable for maintaining the safety of the device when operating in high-temperature environments.

What is claimed is:

1. An electrolyte composition comprising at least one organosilicon and a lithium-containing salt, wherein the organosilicon is:

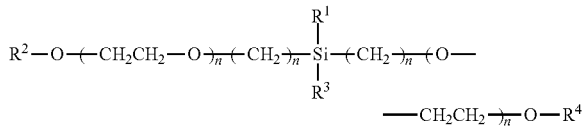

wherein R$^1$, R$^2$, R$^3$, and R$^4$ are the same or different and are independently selected from the group consisting of C$_1$-C$_6$ linear, branched, or cyclic alkyl, and each "n" is independently an integer of from 1 to 15; and
wherein the composition undergoes no more than about 10% thermal decomposition at a temperature of about 100° C.

2. The electrolyte composition of claim 1, wherein the composition undergoes no more than about 20% thermal decomposition at a temperature of about 150° C.

3. The electrolyte composition of claim 1, wherein the lithium containing salt is selected from the group consisting of LiTFSI, LiPF$_6$, LiBOB, LiClO$_4$, LiBF$_4$, LiAsF$_6$, LiSbF$_6$, LiTaF$_6$, LiNbF$_6$, LiCF$_3$SO$_3$, LiC$_4$F$_9$SO$_3$, Li(FSO$_2$)$_2$N, Li(CF$_3$SO$_2$)$_2$N, Li(C$_2$F$_5$SO$_2$)$_2$N, Li(CF$_3$SO$_2$)$_3$C, LiBF$_3$(C$_2$F$_5$), LiB(C$_2$O$_4$)$_2$, LiB(C$_6$F$_5$)$_4$, LiPF$_3$(C$_2$F$_5$)$_3$, ½Li$_2$B$_{12}$F$_{12}$, and combinations thereof.

4. The electrolyte composition of claim 3, wherein the lithium-containing salt is present in a concentration of from about 0.1 M to about 3.5 M.

5. The electrolyte composition of claim 3, wherein the composition undergoes no more than about 20% thermal decomposition at a temperature of about 150° C.

6. The electrolyte composition of claim 1, wherein the lithium-containing salt is selected from the group consisting of LiPF$_6$, LiBF$_4$, LiAsF$_6$, LiSbF$_6$, LiTaF$_6$, and LiNbF$_6$.

7. The electrolyte composition of claim 6, wherein the lithium-containing salt is present in a concentration of from about 0.1 M to about 3.5 M.

8. The electrolyte composition of claim 7, wherein the composition undergoes no more than about 20% thermal decomposition at a temperature of about 150° C.

9. The electrolyte composition of claim 1, further comprising a co-solvent.

10. The electrolyte composition of claim 9, wherein the co-solvent comprises a carbonate moiety (—O—C(═O)—O—).

11. The electrolyte composition of claim 1,
wherein when the organosilicon includes a Si—O bond, and is formulated with 20 wt % ethylene carbonate co-solvent and 1M LiPF$_6$, it has a potential of at least about 5 V when current exceeds 1 mA/cm$^2$ in a three-electrode cell comprising a platinum working electrode, a lithium counter-electrode, and a Li/Li$^+$ reference electrode; and
wherein when the organosilicon does not include a Si—O bond, and is formulated with 20 wt % ethylene carbonate co-solvent and 1M LiPF$_6$, it has a potential of at least about 6 V when current exceeds 1 mA/cm$^2$ in a three-electrode cell comprising a platinum working electrode, a lithium counter-electrode, and a Li/Li$^+$ reference electrode.

12. An electrochemical device comprising an electrolyte composition as recited in claim 1.

* * * * *